United States Patent [19]

Ross

[11] 4,371,382

[45] * Feb. 1, 1983

[54] PROCESS AND APPARATUS FOR THE CONTACT AND SEPARATION OF IMMISCIBLE FLUIDS

[75] Inventor: Leon I. Ross, Grand Cayman, Cayman Islands

[73] Assignee: Caribbean Properties Limited, Grand Cayman, Cayman Islands

[ * ] Notice: The portion of the term of this patent subsequent to Oct. 27, 1998, has been disclaimed.

[21] Appl. No.: 281,097

[22] Filed: Jul. 7, 1981

Related U.S. Application Data

[63] Continuation of Ser. No. 175,841, Oct. 2, 1980, Pat. No. 4,297,111, which is a continuation-in-part of Ser. No. 76,679, Sep. 19, 1979, abandoned, which is a continuation of Ser. No. 878,389, Feb. 16, 1978, abandoned.

[51] Int. Cl.³ .................... B01D 47/16; B01D 47/18
[52] U.S. Cl. ............................................. 55/92; 55/235; 55/238; 159/6 R; 159/49; 210/788; 261/79 A; 261/89; 261/90; 261/112
[58] Field of Search ............... 261/79 A, 88–90, 261/112, 115, 118; 55/92, 226, 235–238; 210/788; 159/6 R, 49, 13 R, 13 A, 13 B

[56] References Cited

U.S. PATENT DOCUMENTS

| | | | |
|---|---|---|---|
| 1,079,849 | 11/1913 | Ernst | 55/237 X |
| 1,494,675 | 5/1924 | Ehrhart | 261/79 A |
| 2,224,429 | 12/1940 | Fisher | 261/79 A X |
| 2,551,890 | 5/1951 | Love | 55/237 |
| 3,233,879 | 2/1966 | Mitchell | 261/79 A |
| 3,620,509 | 11/1971 | Roman | 261/79 A X |
| 3,802,161 | 4/1974 | Talbert | 55/226 |
| 4,059,419 | 11/1977 | Ross | 55/237 X |

FOREIGN PATENT DOCUMENTS

| | | | |
|---|---|---|---|
| 1445978 | 8/1976 | United Kingdom | 55/235 |
| 479478 | 11/1975 | U.S.S.R. | 261/79 A |

Primary Examiner—Richard L. Chiesa
Attorney, Agent, or Firm—McAulay, Fields, Fisher, Goldstein & Nissen

[57] ABSTRACT

A process and apparatus for the continuous contact and the subsequent separation from one another of immiscible fluids differing in density from one another, in which the entrainment of either fluid by the other is suppressed by obliging the less dense fluid to flow radially inward, from an annular passage between the interlapped walls of two coaxial conduits, through a generally continuous spinning ring of the denser fluid connecting the overlapped outlet of the inner conduit with the overlapping wall of the outer conduit, the two immiscible fluids separating centrifugally from one another with the less dense fluid being withdrawn from an inner space closer to the axis of spin than the surrounding denser fluid being separately withdrawn from the outer conduit.

46 Claims, 8 Drawing Figures

FIG. I.

FIG. 6.
FIG. 7.
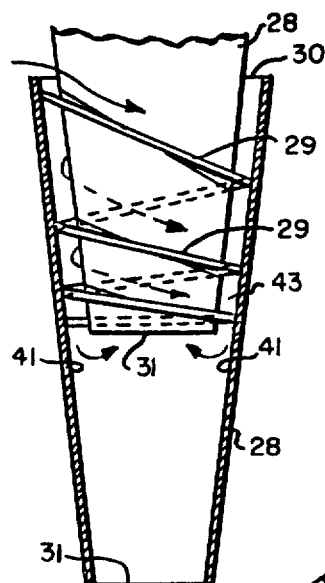
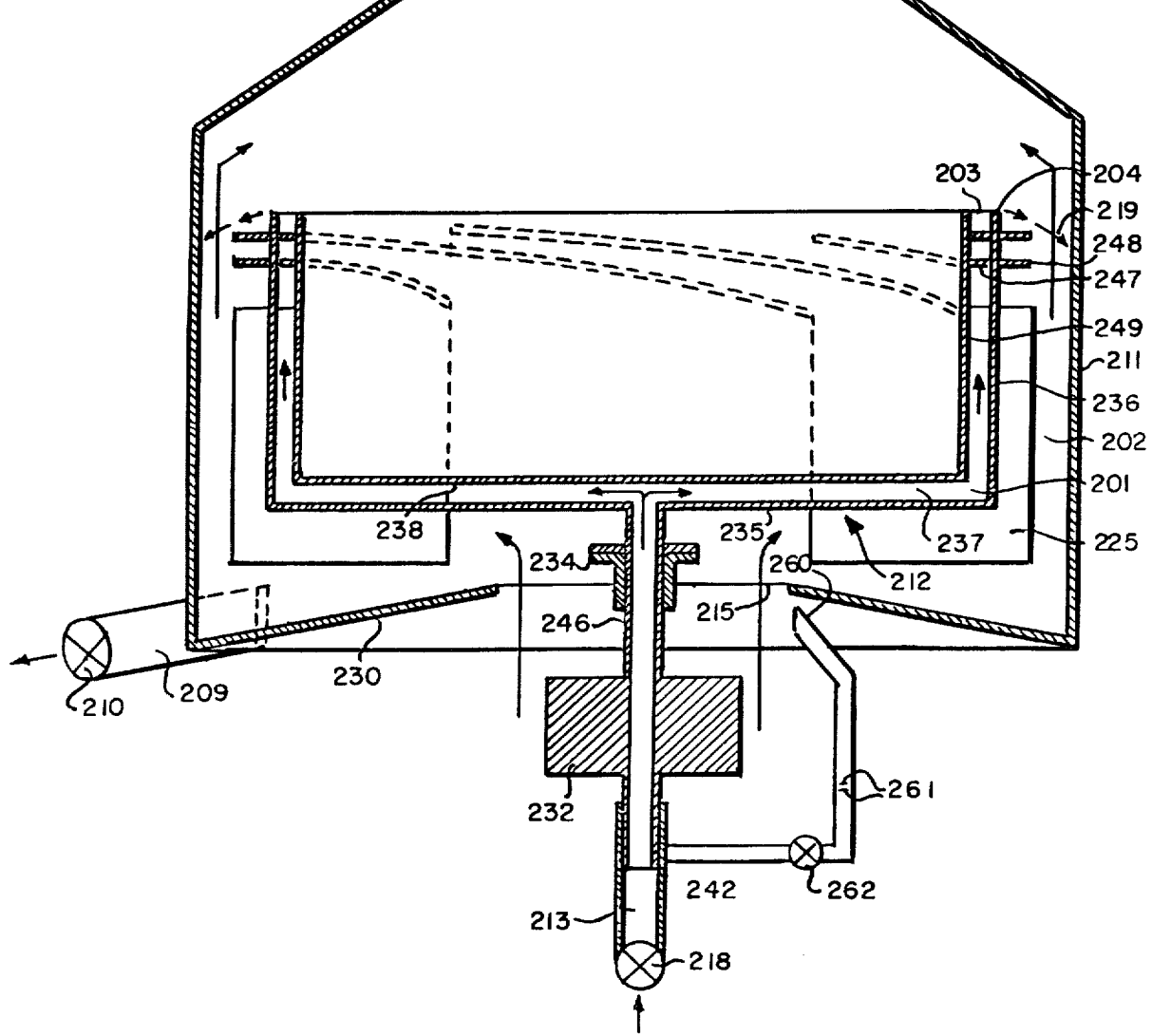

PROCESS AND APPARATUS FOR THE CONTACT AND SEPARATION OF IMMISCIBLE FLUIDS

This application is a continuation of co-pending application Ser. No. 175,841, filed on Oct. 2, 1980 now U.S. Pat. No. 4,297,111, issued Oct. 27, 1981, which, in turn, was a continuation in part of copending application Ser. No. 076,679, filed Sept. 19, 1979 now abandoned by the same inventor, which is a continuation of application Ser. No. 878,389, now abandoned, filed Feb. 16, 1978 by the same inventor.

FIELD OF THE INVENTION

This invention relates to a process and an apparatus for the continuous contact and the subsequent separation from one another of immiscible fluids differing in density from one another. Such contact may involve heat exchange, one or more chemical reactions or the physical transfer of one or more constituents from one fluid to another, whereby the denser fluid product ultimately separated may differ in composition from a denser fluid feed initially brought into contact with a less dense fluid feed, which can also differ significantly from the less dense fluid product finally separated.

Either of the fluid feeds can comprise a gaseous or vapor phase, one or more liquid phases or a stream of solids divided finely enough to flow like a fluid, either alone or suspended in a liquid or gaseous medium. The fluid products can also comprise any of the above so long as each product comprises at least one phase not miscible with the other product.

BACKGROUND OF THE INVENTION

Since any interaction between immiscible fluids depends upon the extent of their physical contact with one another, the rate of such interaction will become a direct function of both the area of interphase surface exposed to one another and the duration of such exposure. Consequently, apparatus requiring such interaction is usually designed to augment the area of interphase contact by dispersing finely divided particles or globules of one phase into a generally continuous stream of another phase. However, the more finely divided the disperse phase becomes, the more susceptible does it become to entrainment by the continuous phase. Even where two immiscible fluids are merely made to flow through or past one another, the faster their flow relative to one another, the greater will be the frictional drag which will tend to entrain part of each fluid in the other. For this reason, the effective capacity of such apparatus will ultimately be limited by its ability to separate the respective fluids from one another after contact.

OBJECTS AND SUMMARY OF THE INVENTION

This invention makes it possible not only to suppress the tendency toward such entrainment in either fluid but also to separate existing suspensions of one fluid in another by providing a process for the continuous contact of a denser fluid feed with a less dense fluid feed and the subsequent separation of a resultant denser fluid product from a less dense immiscible fluid product, the process comprising:

(a) introducing the denser fluid feed into a first conduit, having a wall with a generally circular transverse section surrounding a central longitudinal axis, the conduit being open at one end to provide an outlet for the denser fluid feed therefrom, the outlet having a circular rim, centered upon the longitudinal axis of the conduit and located in a plane generally perpendicular thereto, (b) directing the flow of the denser fluid feed through the first conduit axially toward and through the said circular outlet into a coaxial second conduit, also having a wall with a generally circular transverse section overlapping the wall of the first conduit, surrounding the circular outlet and defining a generally annular passage between the interlapped walls of the coaxial conduits, the annular passage having an outlet defined by the rim of the outlet from the first conduit, (c) spinning the denser fluid feed emerging from the circular outlet of the first conduit around the longitudinal axis thereof fast enough to form the emerging denser fluid into a generally continuous spinning fluid ring connecting the rim of the said circular outlet directly with the overlapping wall of the second conduit, thereby curtaining off the outlet from the annular passage between the interlapped walls of the coaxial conduits, (d) introducing the less dense fluid feed into the annular passage between the interlapped walls of the coaxial conduits, (e) directing the flow of the less dense fluid feed through the said annular passage axially toward and through the outlet thereof, the said outlet having been curtained off by the generally continuous spinning ring of denser fluid connecting the interlapped walls of the coaxial conduits, whereby the less dense fluid feed must be intercepted by the said spinning fluid ring, the fluid feeds consequently interacting with one another within the second conduit to yield immiscible fluid products differing in density from one another, the spinning fluid products separating centrifugally from one another, with the less dense fluid product flowing toward an inner space closer to the longitudinal axis than the surrounding denser fluid product, (f) withdrawing the less dense fluid product from the said inner space and (g) separately withdrawing the denser fluid product from the second conduit.

Because the less dense fluid is made to pass radially inward through a generally continuous spinning curtain of the denser fluid, the centrifugal acceleration of the spinning fluids will tend to offset the radial component of their frictional drag upon one another and suppress the entrainment of either fluid by the other. This effect will be augmented if both fluid feeds are made to spin in the same direction around the longitudinal axis of the conduits before they are brought into contact with one another.

The same effect will also tend to assist the transfer of suspended constituents of either fluid into the other fluid during the passage of the less dense fluid through the spinning ring of denser fluid. Where the denser fluid comprises a generally continuous liquid phase, the addition of a wetting agent to reduce the surface tension of the liquid phase will help to maintain the continuity of the spinning liquid ring over a greater potential radial width as its thickness is diminished during its outward flow between the interlapped walls of the coaxial conduits, besides enabling such a liquid phase better to wet particulate matter suspended in the less dense fluid passing through it.

Where this less dense fluid comprises a suspension of solid particulate matter in a gaseous carrier, it is often preferable to convert such suspended particulate matter into mist droplets before the passage of the suspension through the spinning liquid ring in order to facilitate their transfer to the spinning liquid. In case the tiny size of the suspended particulate matter makes each particle difficult to wet by other means, they can be wet by the condensation of the vapor of the liquid feed (or of another liquid soluble therein) directly from the vapor phase upon the surfaces of the dry particles. This not only wets the particles to convert them into more easily captured mist droplets but also increases their weight to make them more susceptible to centrifugal separation.

Even when the suspended particles are too tiny to be centrifugally separated solely by spinning the less dense fluid, their passage through the spinning fluid ring will subject them to a centrifugal bombardment of denser fluid which will impel the tiny particles outward along with the denser fluid. This is even true when the denser fluid comprises a stream of solid particles.

A significant feature of this invention is the continuous centrifugal acceleration of the spinning fluid products during and after contact with one another. After the less dense fluid feed has been obliged to pass radially inward, from the annular passage between the coaxial conduits, through the generally continuous ring of denser fluid feed spinning outward from the outlet of the first conduit to the overlapping wall of the second conduit, the less dense fluid product is spun into an inner space surrounded by the denser fluid product spinning against the wall of the second conduit. The only subsequent contact of either fluid product with the other, as they continue to spin around the longitudinal axis of the conduit, will be at the spinning interface between them, where their centrifugal acceleration will tend to separate them from one another rather than to re-entrain either fluid in the other.

This invention also provides apparatus for the continuous contact of a denser fluid feed with a less dense fluid feed and the subsequent separation of a resultant denser fluid product from a less dense immiscible fluid product, the apparatus comprising:

(a) a first conduit, having a wall with a generally circular transverse section surrounding a central longitudinal axis, the conduit being open at one end to provide an outlet for the denser fluid feed therefrom, the outlet having a circular rim, centered upon the longitudinal axis of the conduit and located in a plane generally perpendicular thereto, (b) a second conduit, coaxial with the first conduit, the second conduit also having a wall with a generally circular transverse section overlapping the wall of the first conduit, surrounding the said circular outlet for the denser fluid therefrom and defining a generally annular passage between the interlapped walls of the coaxial conduits, the annular passage having an outlet defined by the rims of the outlet from the first conduit, (c) means for introducing the denser fluid feed into the first conduit, (d) means for directing the flow of the denser fluid feed through the first conduit axially toward and through the said circular outlet therefrom into the overlapping coaxial second conduit, (e) means for spinning the denser fluid feed emerging from the circular outlet of the first conduit around the longitudinal axis thereof fast enough to form the emerging denser fluid into a generally continuous spinning fluid ring connecting the rim of the said circular outlet directly with the overlapping wall of the second conduit, thereby curtaining off the outlet from the annular passage between the interlapped walls of the coaxial conduits, (f) means for introducing the less dense fluid feed into the annular passage between the interlapped walls of the coaxial conduits, (g) means for directing the flow of the less dense fluid feed through the said annular passage axially toward and through the outlet thereof, the said outlet having been curtained off by the generally continuous spinning ring of denser fluid connecting the interlapped walls of the coaxial conduits, whereby the less dense fluid feed must be intercepted by the said spinning fluid ring, the fluid feeds consequently interacting with one another within the second conduit to yield immiscible fluid products differing in density from one another, the spinning fluid products separating centrifugally from one another, with the less dense fluid product flowing toward an inner space closer to the longitudinal axis than the surrounding denser fluid product, (h) an outlet for the less dense fluid product from the said inner space and (i) a separate outlet for the denser fluid product from the second conduit.

The means for spinning the denser fluid feed can be applied either directly to the denser fluid feed by spinning the denser fluid feed itself before it emerges from the first conduit, indirectly by spinning the less dense fluid feed before it emerges from the annular passage between the interlapped conduits or preferably by separately spinning both fluid feeds before they are brought into contact with one another. Any spinning motion imparted to either of the fluid feeds before they interact with one another will affect the spin of the other fluid feed as soon as they meet. Once the two fluid feeds have been brought into contact with one another, they will each tend to spin one another at the same speed and the only significant relative motion between them will become their relatively slow generally countercurrent radial velocities toward and away from the longitudinal axis around which they are spinning.

Either fluid feed can therefore be spun around the longitudinal axis of the conduits by any one or any combination of well known means, such as a rotating fan or impeller, the rotation of either or both conduits, one or more tangential inlets for either or both of the fluid feeds or one or more helical or other vanes or channels in either or both conduits. The spinning motion of either fluid feed can also be imparted or accelerated by the tangential introduction into either conduit of steam or other vapor which can condense to a liquid miscible with either of the fluid feeds.

The means for introducing the denser fluid feed will normally comprise an inlet into the first conduit but, for certain applications, other means can sense this function. For example, where the sensor fluid feed is a liquid, the vapors which constitutes all or part of the less dense fluid product, a cooling coil or jacket around the first conduit could condense the vapor there into the liquid phase, thus introducing the sensor fluid feed into the first conduit without the necessity for a separate inlet for the denser fluid area.

The means for introducing the less dense fluid feed will normally comprise an inlet into the annular passage between the interlapped walls of the coaxial conduits but, for certain applications, other means can serve this function. For example, where the less dense fluid feed is the vapor of one of the constituents of the denser fluid product or where a gas is dissolved in or adsorbed by the denser fluid product, a heating coil or jacket around the second conduit could drive the vapor or gas from the denser fluid product, thus introducing the less dense fluid feed into the annular passage without the necessity for a separate inlet for the less dense fluid feed.

Whenever a single unit of apparatus cannot bring the interaction between the fluid feeds to the desired degree of completion, additional units can be connected in series with one another. The less dense fluid feed would initially be introduced into the annular passage between the interlapped walls of the first unit of the series, in which the denser fluid feed entering the first conduit, of that unit would be the denser fluid product discharged from the second conduit of the second unit of the series, while the denser fluid feed would initially be introduced into the first conduit of the last unit of the series, in which the less dense fluid feed would be the less dense fluid product from the outlet from the inner space around the longitudinal axis of the next to last unit.

Such an arrangement is particularly suitable for the countercurrent extraction of soluble constituents from any fluid by a liquid and for the continuous fractional distillation or rectification of miscible liquids. In the latter case, the mixed fluids could be continuously introduced by an additional inlet into an intermediate unit, the more volatile fraction exhausted from the outlet from the inner space of the last unit in the vapor phase, while the less volatile fraction would be continuously discharged from the second conduit of the first unit in the liquid phase.

This apparatus is capable not only of suppressing the potential entrainment of either fluid feed after contact with the other fluid feed but, especially when the denser fluid feed is a liquid in which mist droplets are soluble, of effecting the capture of such mist droplets from a suspension thereof in a gaseous (less dense fluid) feed when the suspension is passed through the spinning liquid ring connecting the interlapped walls of the coaxial conduits. In order to facilitate the capture in this way of dry solid particles from gaseous suspensions, it is often preferable first to convert them into such mist droplets by the condensation upon the dry particles of the vapor of the liquid feed or of another liquid soluble in it. The vapor can either be admitted into the gaseous feed through an appropriate inlet before the suspension is intercepted by the spinning liquid ring or evaporated from the spinning liquid and recondensed closer to the longitudinal axis when the velocity of spin is fast enough to provide the radial temperature gradient required. Further details of this alternative may be found in our U.S. Pat. No. 4,059,419. When the spinning suspension of mist droplets encounters the spinning liquid ring connecting the interlapped walls of the coaxial conduits, the mist droplets tend to become part of the liquid ring spinning outward toward the liquid product outlet from the second conduit while the relatively mist-free gaseous product continues its inward motion toward its separate outlet from the inner space. The particulate nuclei upon which the vapor has condensed to form these mist droplets are thereby separated from the scrubbed gaseous feed and carried off with the effluent liquid product discharged from the second conduit. The addition of agglomerants, such as polyelectrolytes, to the liquid feed can cause fine particles suspended in the effluent liquid product to coalesce into agglomerates heavy enough to settle therein in the form of an easily separable sludge.

FIG. 6 shows, on a larger scale and in greater detail, a partly cut away vertical elevation of a pair of the funnels shown in FIG. 5 together with the helical guide between them;

FIG. 7 shows, in partly schematic form, a partly cut away vertical elevation of a sixth embodiment of the invention with rotating impellers and a vertical longitudinal axis.

Figure 1:
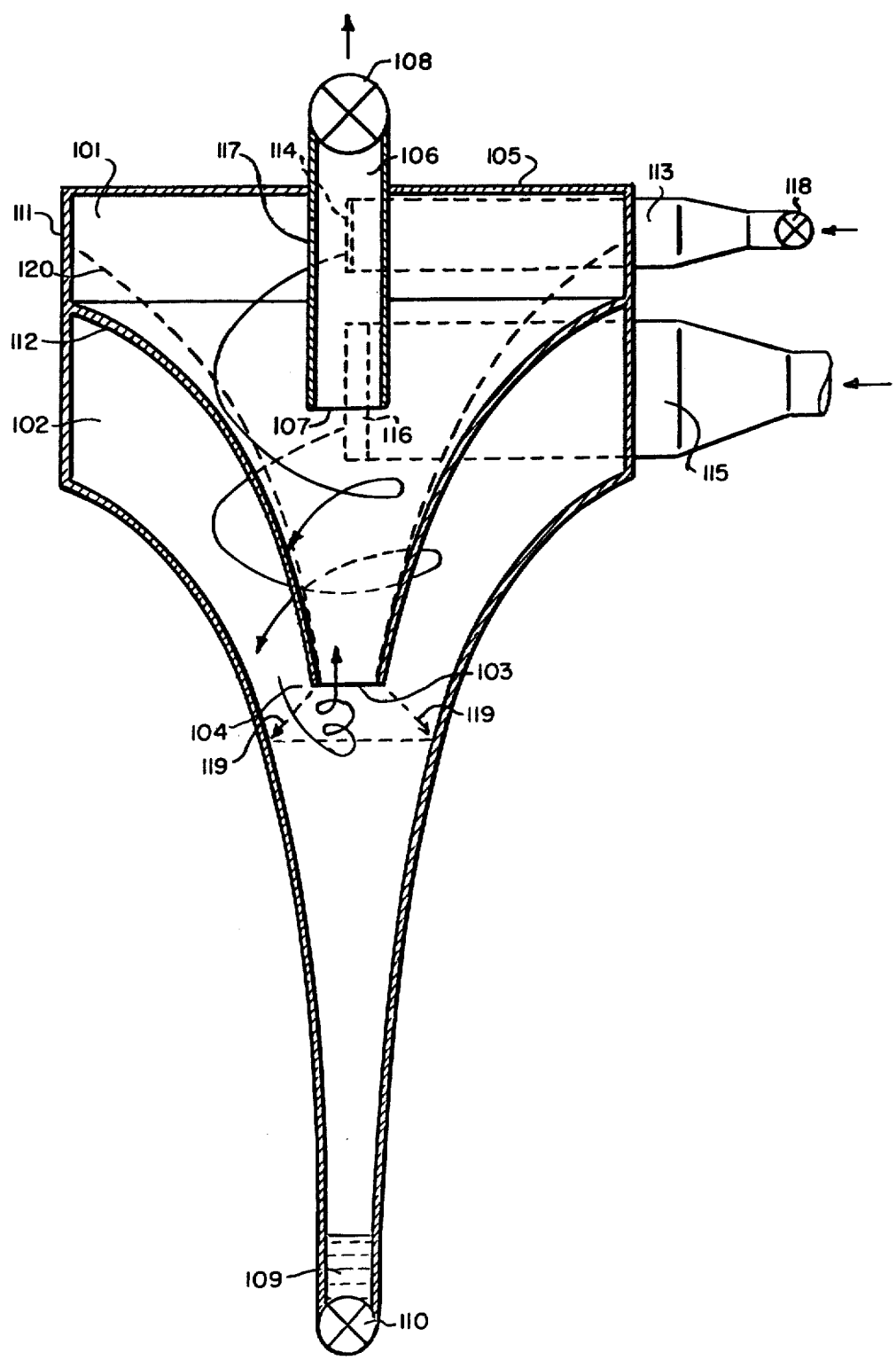
FIG. 1 shows, in partly schematic form, a partly cut away vertical elevation of one embodiment of the apparatus in its simplest form, with no moving parts and a vertical longitudinal axis.

Referring to FIG. 1, the apparatus comprises a wall 111, with a generally circular transverse section and a vertical longitudinal axis, enclosing a space divided by a transverse partition 112 into two coaxial conduits, a first conduit 101 on the upper side of the partition 112 and a second conduit 102 on the lower side. The partition 112 converges downward from its juncture with the wall 111 toward the longitudinal axis and ends in a horizontal opening 103, with a circular rim 104, centered thereon to provide an outlet for the denser fluid feed from the first conduit 101 into the second conduit 102, as well as an outlet for the less dense fluid product from the second conduit 102 into the first conduit 101.

The upper end of the first conduit 101 is closed by a top 105, except for a cylindrical wall 117, coaxial with the wall 111, which penetrates the center of the top 105 to define a less dense fluid product outlet 106, extending upward from an open lower end 107 of the wall 117 through a less dense fluid throttle valve 108 above the top 105.

The wall 111 also converges downward towards the longitudinal axis whereby its open lower end merges with the wall of a denser fluid product outlet 109 extending from the bottom of the second conduit 102 through a denser fluid product outlet valve 110.

At a level above the juncture of the partition 112 and the wall 111, and preferably above the lower end 107 of the less dense fluid product outlet 106, a denser fluid feed inlet 113 is mounted tangentially to the wall 111 and directed horizontally therethrough into the first conduit 101. The inlet 113 is preferably convergent toward a relatively narrow vertical slot 114, which penetrates the wall 111 to serve as the throat of a convergent nozzle to accelerate the velocity of the denser fluid feed introduced into the inlet 113 through a denser fluid feed valve 118.

At a level below the juncture of the partition 112 and the wall 111 and above that of the circular rim 104, a less dense fluid feed inlet 115 is also mounted tangentially to the wall 111 and directed horizontally therethrough, in the same circumferential direction as the denser fluid feed inlet 113, into the second conduit 102. The inlet 115 is also preferably convergent toward a relatively narrow vertical slot 116, which penetrates the wall 111 to serve as the throat of a convergent nozzle to accelerate the velocity of the less dense fluid feed.

In operation, the denser fluid feed is introduced continuously into the first conduit 101 through the denser fluid feed inlet 113 and the narrow vertical slot 114 at a rate controlled by the denser fluid valve 118. Because of the tangential configuration of the inlet 113 and the increase in velocity induced by its convergence into the slot 114, the denser fluid feed will be directed along the upper surface of the partition 112, against which it will spin around the longitudinal axis of the first conduit 101 fast enough to form a free vortex with a surface 120 approaching the vertical at the circular rim 104 of the outlet 103 for the denser fluid feed from the first conduit.

After enough of the denser fluid feed has been introduced into the first conduit 101 to narrow the inner diameter of the vortex surface 120 to that of the outlet 103, the spinning denser fluid feed will overflow the circular rim 104 and spin radially outward and downward through the second conduit 102 in the form of a generally continuous spinning fluid ring 119 connecting the circular rim 104 with the overlapping wall 111, thereby curtaining off the lower portion of the second conduit 102 from the annular upper portion thereof above the rim 104.

Meanwhile the less dense fluid feed is introduced continuously into the annular upper portion of the second conduit 102 through the less dense fluid feed inlet 115 and the narrow vertical slot 116 at a rate controlled by the less dense fluid throttle valve 108. Because of the tangential configuration at the inlet 115 and the increase in velocity induced by its convergence into the slot 116, the less dense fluid feed will be spun around the vertical longitudinal axis of the annular upper portion of the second conduit 102 in the same circumferential direction as the generally continuous spinning ring 119 of denser fluid emerging from the first conduit 101 and curtaining off the lower portion of the second conduit 102 from the annular upper portion thereof at the rim 104.

The spinning less dense fluid feed flowing generally inward and downward through the annular upper portion of the second conduit 102 must consequently be intercepted by the generally continuous spinning ring 119 of denser fluid, whereby the fluid feeds will interact with one another, while spinning in the same direction, to yield immiscible fluid products differing in density from one another. The spinning fluid products will separate centrifugally from one another in the second conduit 102, with the denser fluid product spinning downward along the wall 111 into the denser fluid product outlet 109, from which it is withdrawn at a rate controlled by the denser fluid product outlet valve 110, while the less dense fluid product spins inward and upward out of the second conduit 102 through the opening 103 and the first conduit 101 until it is finally withdrawn through the less dense fluid product outlet 106 at a rate controlled by the throttle valve 108.

Since the velocity of spin and centrifugal acceleration of both fluid streams are near their maxima as they pass the circular rim 104, while their motion relative to one another in a circumferential direction becomes comparatively insignificant, the surface to surface contact of both fluids is enhanced while the tendency of either fluid to entrain the other is suppressed. On the contrary, denser particles or droplets suspended in the less dense fluid feed will tend to be captured by the denser fluid product, while less dense constituents of the denser fluid feed will tend to be withdrawn with the less dense fluid product.

This apparatus is also effective, for example, in the extraction or leaching by a liquid fluid feed of soluble constituents of the other fluid feed, which may comprise an immiscible liquid, a gas, a vapor or a stream of solids.

Figure 2:
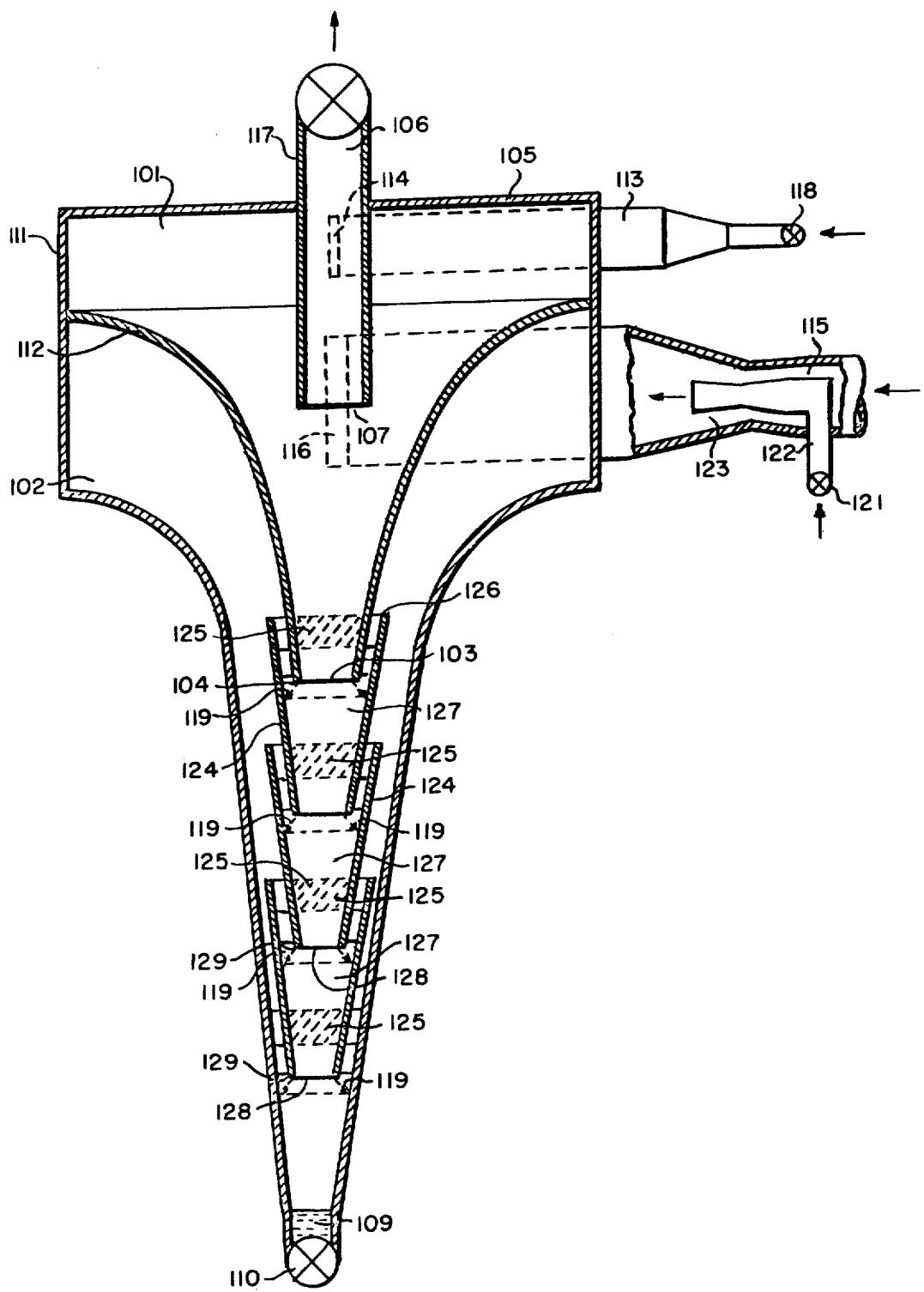
FIG. 2 shows, in partly schematic form, a partly cut away vertical elevation of a second embodiment of the apparatus, with a number of coaxial spinning rings of denser fluid connecting the overlapping walls of coaxial conduits.

The apparatus illustrated in FIG. 2 is identical with that shown in FIG. 1, plus some additional features. In order to increase the capacity of the apparatus without extending the width of the spinning ring 119 of denser fluid so far that it is no longer capable of remaining generally continuous, a number of coaxial funnels 127, each defined by a wall 124 with a generally circular transverse section coaxial with the walls of the conduits 101 and 102, are interposed between them. Each of the walls 124 is open at both ends and converges downward toward its longitudinal axis to define an annular inlet 126 for the less dense fluid feed into its funnel 127 and a horizontal denser fluid outlet 128 with a circular rim 129. A number of stationary guides or vanes 125, preferably curved to augment the velocity of spin of the less dense fluid feed entering the annular inlets 126, are mounted in a ring around the upper part of the inner surface of each of the walls 124 and serve both to separate each wall 124 from the wall immediately above it and to accelerate the spin of the less dense fluid feed flowing through the annular portion of the funnel 127. A similar ring of guides 125 is mounted around the lower part of the outer surface of the lowest of the walls 124 to separate that wall 124 from the lower part of the wall 111.

The effect of the interposition of the coaxial funnels 127 is consequently to reduce the width of the spinning fluid ring 119 from the gap between the circular rim 104 and the wall 111 to that between the rim 104 and the highest of the walls 124 in order that the annular conduit to be curtained off by the fluid ring 119 not be so wide that the ring 119 breaks up before reaching the wall. Therefore, instead of all the less dense fluid feed passing through a single spinning ring 119 of denser fluid, the less dense fluid feed is divided by the walls 124 into a number of generally coaxial fluid streams, each of which passes through a separate narrower spinning ring 119 of denser fluid, each such ring 119 remaining continuous throughout its flow, first from the rim 104 to the first of the walls 124, later from each of the rims 129 to the overlapping walls 124 and finally from the last of the rims 129 to the wall 111. This feature is useful, for example, when the apparatus serves as a cooling tower or dryer. The denser fluid feed then is water or an aqueous solution from which water vapor is to be transferred to a stream of air, the less dense fluid feed. First the highest of the spinning aqueous rings 119 meets a fresh stream of dry air which evaporates some of its water before rising toward the outlet 106. The partially evaporated aqueous liquid continues to spin downward through the highest of the funnels 127 to form the next highest of the spinning aqueous rings 119, where it meets another fresh stream of dry air which evaporates more of its water content and carries it off through the outlet. Each successively lower spinning aqueous ring 119 loses more water to a fresh stream of dry air until the denser fluid product is finally withdrawn through the outlet 109.

Another feature included in the apparatus shown in FIG. 2 is a vapor inlet 122, leading from a vapor inlet valve 121 into the less dense fluid feed inlet 115, preferably through an ejector 123. The introduction of steam or other vapor through the vapor inlet 122, at a rate controlled by the vapor inlet valve 121, serves both to accelerate the spin of the less dense fluid feed entering the conduit 102 through the slot 116 and to add to the vapor content of the less dense fluid feed. This can be useful, for example, where the less dense fluid feed is a suspension of particulate matter in a gaseous carrier and the denser fluid feed is an aqueous or other liquid serving to scrub the particulates therefrom. When the size of the suspended particulates is so tiny that they can neither be separated centrifugally from the gaseous carrier nor wet by contact with the scrubbing liquid, the introduction into the gaseous carrier of steam or other vapor can serve to supersaturate the gaseous carrier with the vapor, which will condense directly from the vapor phase upon the surfaces of the suspended particles, increasing their weight to make them more easily separable centrifugally and converting the previously dry particles into mist droplets more easily captured by the spinning ring 119 of scrubbing liquid.

Figure 3:
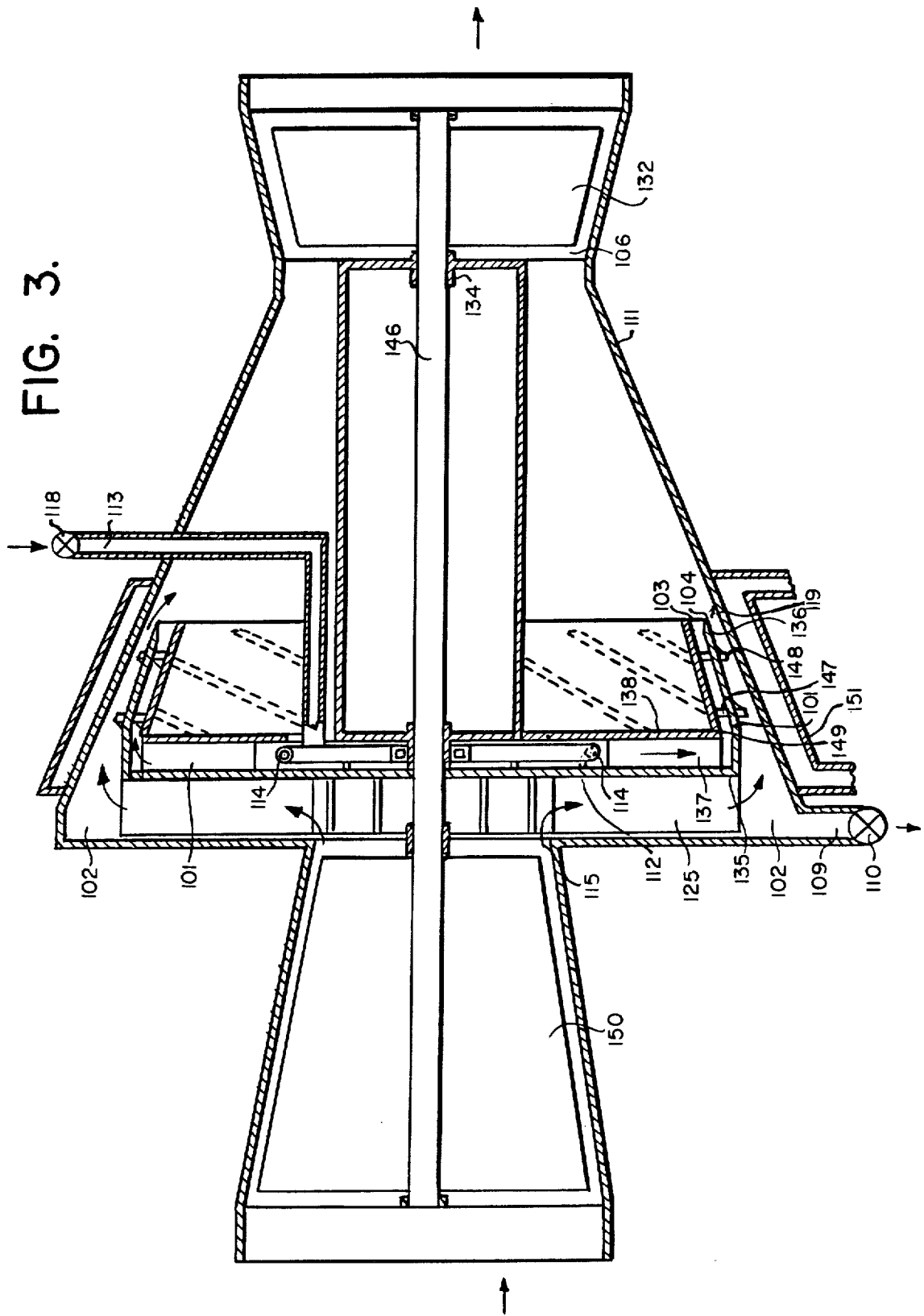
FIG. 3 shows, in partly schematic form, a partly cut away vertical elevation of a third embodiment of the apparatus, with rotating impellers and a horizontal longitudinal axis.

The embodiment of the apparatus shown in FIG. 3 comprises a vessel with a wall 111, having a generally circular transverse section and a horizontal longitudinal axis, open at both ends to provide a less dense fluid feed inlet 115 at one end and a less dense fluid product outlet 106 at the other end. The wall 111 extends radially outward from the inlet 115 to its widest transverse section at that end and gradually converges from that end toward the outlet 106 at the other end.

A rotor 112, with a generally circular transverse section coaxial with the wall 111, divides the space within the wall 111 into two coaxial conduits, a first conduit 101 generally within the rotor 112 and a second conduit 102 generally surrounding the rotor 112.

The rotor 112 comprises a disk 135, attached at its center perpendicularly to a horizontal shaft 146 and at its outer edges to a coaxial rotor wall 136, with a circular transverse section generally convergent from its juncture with the disk 135 toward its opposite end, which is open to provide the first conduit 101 with an outlet 103 with a circular rim 104, defining an annular passage in the portion of the second conduit 102 between the rotor wall 136 and the wall 111. The shaft 146 is supported by bearings 134 and spun around its horizontal axis by a drive 132.

A denser fluid feed inlet 113 penetrates the wall 111 between the outlet 103 and the outlet 106 and extends through the wall 111 from a denser fluid feed valve 118 to a number of nozzles 114 opening into the first conduit 101, preferably circumferentially in the direction of rotation of the rotor 112.

A denser fluid product outlet 109 penetrates the wall 111 at its widest diameter near the inlet 115 and extends downward from the second conduit 102, preferably tangentially, through a denser fluid product outlet valve 110.

A ring of radial impellers 125, each extending from an inner circle at the outer edge of the less dense fluid inlet 115 to the outer edge of the disk 135, is attached to the side of the disk 135 facing the inlet 115 to draw the less dense fluid feed from the inlet 115 into the second conduit 102 and to spin it radially outward into the annular portion of the second conduit 102 between the rotor wall 136 and the wall 111.

A similar ring of radial impellers 137 is mounted on the opposite side of the disk 135 to spin the denser fluid feed from the nozzles 114 through the first conduit 101 toward the rotor wall 136.

A ring of axial impellers 148, preferably in the form of helical vanes connected to the ends of the radial impellers 125 and curved forward to spin the contents of the annular portion of the second conduit 102 faster than the spin of the vanes themselves, is mounted on the outside of the rotor wall 136.

A similar ring of axial impellers 147, preferably connected to the ends of the radial impellers 137, is mounted on the inside of the rotor wall 136 to accelerate the spin of the denser fluid feed in the first conduit 101. The path of the denser fluid feed through the first conduit 101 can be confined to the portion in close contact with the impellers 137 and 147 by affixing an annular disk 138 to the forward edges of the impellers 137 and joining the outer edge of the disk 138 to an inner rotor wall 149, coaxial with the rotor wall 136, attached to the inner edges of the impellers 147, thereby limiting the area of the outlet 103 to the annular opening between the inner rotor wall 149 and the circular rim 104 of the rotor wall 136. The inner edge of the annular disk 138 preferably extends radially inward beyond the inner edges of the impellers 137 and the nozzles 114, the nozzles 114 preferably being located in the first conduit 101 between the parallel disks 135 and 138.

In operation, the apparatus shown in FIG. 3 is analogous to those previously described. The denser fluid feed is continuously introduced into the first conduit 101 through the denser fluid feed inlet 113 and the nozzles 114 at a rate controlled by the denser fluid feed valve 118. The circumferential direction of the nozzles 114 will spin the denser fluid feed around the horizontal axis of the rotor 112 in the same direction as the shaft 146 is continuously being spun around that axis by the drive 132.

The rotation of the shaft 146 and the impellers 137 and 147 will accelerate the rate of spin and the denser fluid feed in the first conduit 101 until it overflows the circular rim 104 of the annular outlet 103 into the second conduit 102 in the form of a generally continuous spinning ring 119 of denser fluid feed connecting the circular rim 104 with the overlapping wall 111, thereby curtaining off the annular portion of the second conduit 102 (between the rotor wall 136 and the wall 111) from the portion extending beyond the rim 104.

Meanwhile, the rotation of the impellers 125 draws the less dense fluid feed through the less dense fluid feed inlet 115 into the second conduit 102, spins it in the same circumferential direction as the denser fluid feed spinning through the first conduit 101 and propels it through the said annular portion of the conduit 102, where the impellers 148 accelerate its rate of spin until it is intercepted by the generally continuous spinning ring 119 of denser fluid feed connecting the circular rim 104 with the wall 111 and curtaining off the annular portion of the second conduit 102.

Consequently, the spinning less dense fluid feed so intercepted will interact with the generally continuous spinning ring 119 of denser fluid feed emerging from the first conduit 101 to yield immiscible fluid products, differing in density from one another and spinning around the horizontal axis of the second conduit 102 fast enough to separate centrifugally from one another. The less dense fluid product will be spun radially inward beyond the spinning ring 119 through the farther portion of the second conduit 102 until it is finally discharged through the less dense fluid product outlet 106, while the denser fluid product will spin outward along the wall 111 through the annular portion of the second conduit 102 until it is withdrawn through the denser fluid product outlet 109 at a rate controlled by the denser fluid product outlet valve 110.

Since both the denser fluid product and the less dense fluid feed are spinning around the longitudinal axis of the second conduit 102 at about the same rate, as they flow axially through the annular portion thereof in opposite directions to one another, the two spinning fluids can interact countercurrently with one another there at the interface between the spinning fluid phases. By varying the length of the rotor wall 136, the extent of such countercurrent interaction in the annular portion of the second conduit 102 can be varied proportionately.

In the case of endothermal or other reactions that proceed too slowly at ambient temperatures to be completed during such countercurrent interaction in the annular portion of the second conduit 102, the rate of such reactions can often be accelerated by energy transmitted through the wall 111 from an external source, preferably located in a ring around the annular portion of the second conduit 102. One of the simplest methods of such transmission of energy through the wall 111 would be the circulation of a hot fluid through an annular jacket 151. Alternative methods could include electromagnetic induction, high frequency sound, microwave or laser radiation or bombardment by sub-atomic particles.

The jacket 151 can also serve to slow down exothermal reactions in the second conduit 102 when a fluid coolant is circulated through it to reduce the reaction temperature. On the other hand, exothermal reactions can be useful in providing the energy required to operate the apparatus. When the interaction of the fluid feeds is exothermal enough to yield a less dense fluid product in the form of a gas or vapor with enough energy to spin the drive 132 (through turbine blades or otherwise) fast enough, not only will no external source of power be required but the apparatus will be able to serve as a prime mover to drive other apparatus.

For example, if the less dense fluid feed comprises gaseous oxygen (as air or otherwise) and the denser fluid feed comprises a stream of finely divided combustible solids with a high ash content (such as coal, oil shale, combustible minerals or combustible waste from paper mills or other sources), the second conduit 102 can serve as the combustion chamber of a gas turbine or jet engine. The less dense fluid feed can be pre-compressed by a compressor 150 (driven by the shaft 146) before entering the second conduit 102 through the inlet 115 while the drive 132 can take the form of a gas turbine driven by the less dense fluid product (the gaseous products of combustion) exhausted through the outlet 106. The solid products of combustion will countercurrently pre-heat the pre-compressed oxygen-bearing gases in the annular portion of the second conduit 102 before being discharged through the denser fluid product outlet 109, while the combustible denser fluid feed will be pre-heated by heat exchange with the gaseous products of combustion during its passage through the inlet 113 and the first conduit 101. It may often be preferable to introduce the combustible solids in suspension in a combustible liquid when first igniting them and later in water to limit the maximum temperature of combustion. Finely divided limestone, magnesite or other basic substances can be added to the denser fluid feed to react with sulfurbearing or other acidic constituents of the fuel during combustion in the second conduit 102 to suppress their escape with the exhaust gases discharged through the outlet 106.

A similar effect can be obtained when the denser fluid feed comprises a stream of finely divided solids capable of serving as a combustion catalyst, while the less dense fluid feed comprises fresh air, preferably pre-compressed in the compressor 150, mixed in the inlet 115 with the incompletely burned exhaust gases from an internal combustion engine. The combustion initiated in the second conduit 102 by the generally continuous ring 119 of spinning catalyst could heat the gases exhausted through the less dense fluid product outlet 106 enough to drive the turbine 132 and compressor 150 not only to compress the air needed for this apparatus but also to turbocharge the internal combustion engine as well.

Alternatively, the denser fluid feed can comprise a stream of finely divided oxide ores or other substances capable of reacting with a less dense fluid feed in the form of reducing gases like hydrocarbons, hydrogen or carbon monoxide. Such a reducing atmosphere can even be achieved in the second conduit 102 when a carbonaceous material is mixed into the denser fluid feed and the less dense fluid feed comprises gaseous oxygen or air.

An exothermal reaction can also be achieved in this apparatus by nuclear fission, where at least one constituent of either fluid feed is fissile and at least one constituent of the other fluid feed is capable of accelerating the rate of nuclear fission in the fissile constituent. The rate of fission can be further accelerated by the presence of a supplemental source of neutron flux surrounding the annular portion of the second conduit 102 (in the jacket 151 or otherwise).

Figure 4:
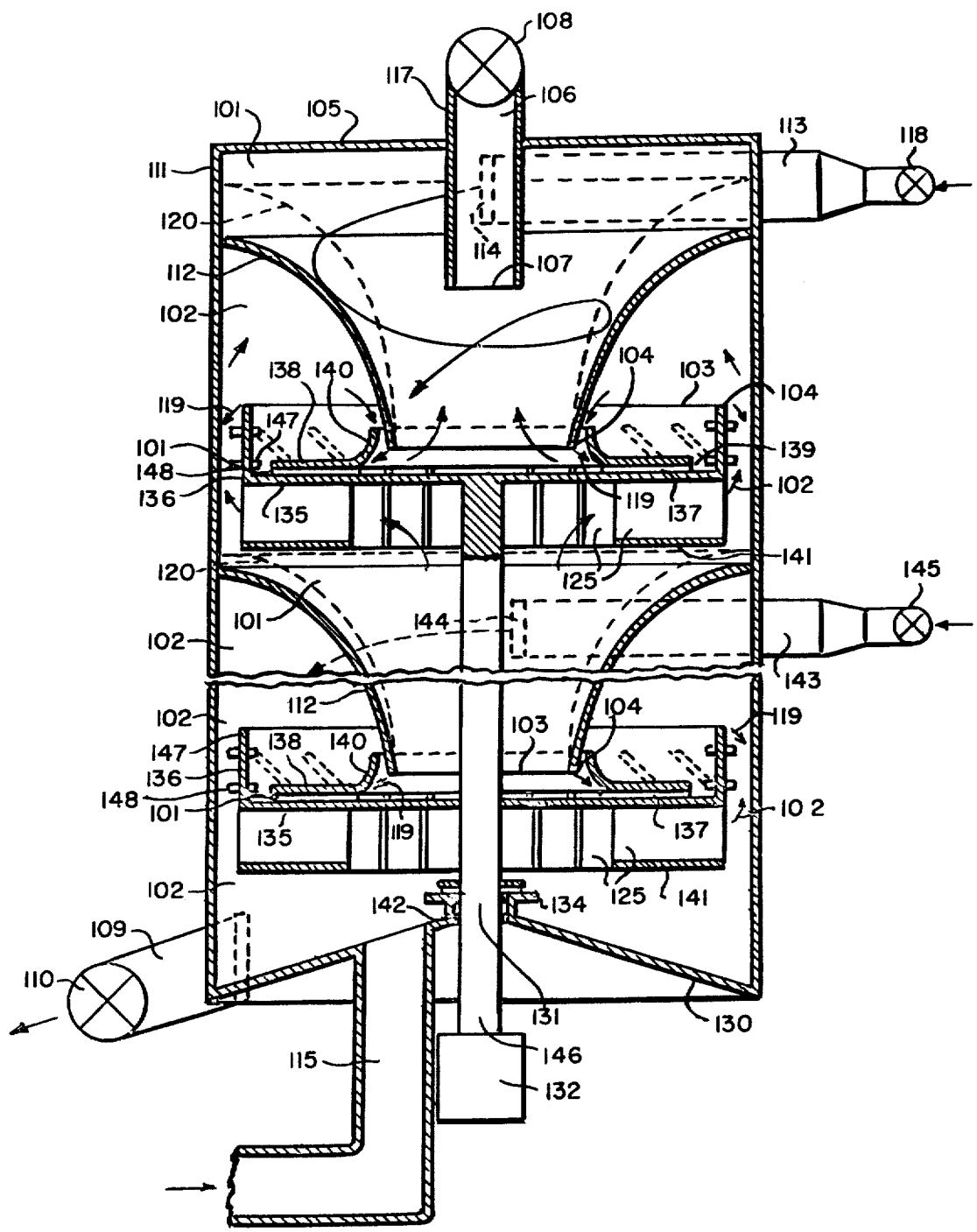
FIG. 4 shows, in partly schematic form, a partly cut away vertical elevation of a fourth embodiment of the apparatus, illustrating how units of the previously described apparatus can be modified to operate in series with one another in a single vessel.

The apparatus shown in FIG. 4 illustrates how individual units of the previously described apparatus can be modified to operate in series with one another in a single vessel.

The vessel comprises a cylindrical side wall 111, with a vertical longitudinal axis, closed at its upper end by a horizontal circular top 105 and at its lower end by a bottom 130 converging upward from its outer edge at the bottom of the side wall 111 toward the vertical longitudinal axis.

The interior of the vessel is divided by a series of transverse partitions 112 into a corresponding series of coaxial conduits, with a first conduit 101 on the upper side of each partition 112 and a second conduit 102 on its lower side. Each of the partitions 112 converges downward from its juncture with the wall 111 toward the longitudinal axis and ends in a horizontal opening 103, with a circular rim 104, centered thereon to provide an outlet of the denser fluid feed from the first conduit 101 into the second conduit 102, as well as an outlet for the less dense fluid product from the second conduit 102 into the first conduit 101.

The center of the top 105 is penetrated by a cylindrical wall 117, coaxial with the side wall 111, defining a less dense fluid product outlet 106 which extends upward from an open lower end 107 of the wall 117 through a less dense fluid throttle valve 108 above the top 105.

At a level above the juncture of the highest partition 112 and the side wall 111, and preferably above the lower end 107 of the less dense fluid product outlet 106, a denser fluid feed inlet 113 is mounted tangentially to the side wall 111 and directed horizontally therethrough into the highest of the first conduits 101. The inlet 113 is preferably convergent toward a relatively narrow vertical slot 114, which penetrates the wall 111 to serve as the throat of a convergent nozzle to accelerate the velocity of the denser fluid feed introduced into the inlet 113 through a denser fluid feed valve 118.

For some applications, such as the continuous separation of mixed fluid feeds by fractional distillation or solvent extraction, a mixed fluid feed inlet 143 can be mounted tangentially to the side wall 111 and directed horizontally therethrough, in the same circumferential direction as the denser fluid feed inlet 113, into the conduit 102 below the juncture of the side wall 111 with one of the intermediate partitions 112. The inlet 143 is also preferably convergent toward a relatively narrow vertical slot 144, which penetrates the wall 111 to serve as the throat of a convergent nozzle to accelerate the velocity of the mixed fluid feed introduced into the inlet 143 through a mixed fluid feed valve 145.

The lower end of the side wall 111 is penetrated by a denser fluid product outlet 109, which is mounted tangentially to the side wall 111, in the opposite circumferential direction to the fluid feed inlets 113 and 143, and directed tangentially downward therefrom through a denser fluid product outlet valve 110 below the level of the bottom 130.

The bottom 130 is penetrated both by a less dense fluid feed inlet 115 located as near the center of the bottom 130 as is convenient, and a central opening 131 to accommodate the vertical shaft 146 of a rotor, coaxial with the side wall 111, within which it is enclosed, and generally symmetrical about its vertical longitudinal axis. The rotor rests upon a bearing 134 surrounding the vertical shaft 146 on the upper edge of the central opening 131, while the shaft 146 is driven by a drive 132 below the central opening 131. Leakage from within the conduit 102 around the shaft 146 is prevented by seals 142.

The rotor comprises a series of horizontal disks 135 attached to the vertical shaft 146 below the horizontal opening 103 at the lower end of each of the partitions 112. The outer rim of each disk 135 is joined to a short hollow cylinder 136, coaxial with the side wall 111 and extending upward from the disk 135 to an open end 103 with a circular rim 104 located near the side wall 111.

Attached to the upper side of each of the disks 135 is a ring of denser fluid impellers 137, each extending from an inner circle, close to but outside of the circular rim 104 of the opening 103 at the lower end of each of the partitions 112, to an outer circle near but not in contact with the inner surface of each cylinder 136. The height of each of the impellers 137 is less than that of the cylinder 136 and the upper edge of each of the impellers 137 is joined to a disk 138, open at the center to the circumference of the inner circle defined by the inner ends of the impellers 137, each disk 138 having a circumference equal to that of the outer circle defined by the outer ends of the impellers 137, thereby defining a series of conduits 101 through which the denser fluid is impelled from the inner ends of the impellers 137 between the impellers 137 through the narrow annular passage between the outer edge 139 of the disk 138 and the inside of the cylinder 136. Along the inner wall of each cylinder 136 is mounted a ring of supplementary impellers 147, preferably in the form of helical vanes connected to the ends of the impellers 137. A baffle 140, coaxial with the side wall 111 and with a circular transverse section converging upward from a base with an inner circumference equal to that of the central opening of the disk 138, is joined to the inner edge of each of the disks 138 to provide an annular passage for the less dense fluid between each of the baffles 140 and the partitions 112, the circular rim 104 of the horizontal opening 103 at the lower end of each of the partitions 112 being overlapped by a baffle 140.

Attached to the lower side of each of the disks 135 is a ring of less dense fluid impellers 125, each extending from an inner circle, with a radius comparable to that of the baffles 140, to the outer rim of the disk 135. Along the outer wall of each cylinder 136 is mounted a ring of supplementary impellers 148, preferably in the form of helical vanes connected to the ends of the impellers 125. Each of the impellers 147 and 148 is preferably curved forward in order to accelerate the spin of the fluids to a higher angular velocity than that of the outer rims of the disks 135. A disk 141, with a diameter equal to that of the disks 135, but open at the center to the circle defined by the inner ends of the impellers 125, is preferably joined to the lower edges of each of the impellers 125 to guide the less dense fluid through a series of conduits 102 between the impellers 125 and through the annular passages between each of the cylinders 136 and the side wall 111.

In operation, the apparatus shown in FIG. 4 functions like those previously described. The denser fluid feed is introduced continuously into the highest of the conduits 101 through the denser fluid feed inlet 113 and the narrow vertical slot 114 at a rate controlled by the denser fluid feed valve 118. Because of the tangential configuration of the inlet 113 and the increase in velocity induced by its convergence into the slot 114, the denser fluid feed will be directed along the upper surface of the highest of the partitions 112, against which it will spin around the vertical longitudinal axis of the highest of the first conduits 101 fast enough to form a free vortex with a surface 120 approaching the vertical at the circular rim 104 of the highest of the outlets 103 for the denser fluid feed from that first conduit 101.

After enough of the denser fluid feed has been introduced into that first conduit 101 to narrow the inner diameter of the vortex surface 120 to that of that outlet 103, the spinning denser fluid feed will overflow that circular rim 104 and spin radially outward and downward through the highest of the second conduits 102 in the form of a generally continuous spinning fluid ring 119 connecting the circular rim 104 with the overlapping highest of the baffles 140, thereby curtaining off the lower portion of that second conduit 102 from the annular upper portion thereof above the rim 104.

The shaft 146, which is rotated continuously by the drive 132 in the same direction as the spinning denser fluid feed, spins the disks 135, 138 and 141, the cylinders 136, the baffles 140 and the impellers 125, 148, 137 and 147 fast enough to keep the spinning denser fluid in contact with the highest of the baffles 140 as it descends inside it until it reaches the next first conduit 101 between the highest of the disks 135 and 138, through which it is spun outward between the highest of the impellers 137 and 147 until it overflows the circular rim 104 of the highest of the cylinder 136 to form a second generally continuous spinning fluid ring 119 connecting that circular rim 104 with the overlapping side wall 111, thereby curtaining off the upper portion of that second conduit 102 from the annular portion thereof below that rim 104.

The spinning denser fluid continues to descend along the side wall 111 until it forms another free vortex in the next lower first conduit 101 above the next lower partition 112, overflows the circular rim 104 of the next lower outlet 103 to form another spinning fluid ring 119 connecting that circular rim 104 with the overlapping next highest of the baffles 140, thereby curtaining off the lower portion of that second conduit 102 from the annular upper portion thereof above that rim 104. The spinning denser fluid continues its descent in contact with that baffle 140 until it reaches the next first conduit 101 between the next highest of the disks 135 and 138, through which it is again spun outward between the next highest of the impellers 137 until it overflows the circular rim 104 of the next highest of the cylinders 136 to form another generally continuous spinning fluid ring 119 connecting that circular rim 104 with the overlapping side wall 111, curtaining off the upper portion of that second conduit 102 from the annular portion thereof below that rim 104.

The spinning denser fluid descends further along the side wall 111, above successive partitions 112 and disks 135, forming successive spinning fluid rings 119 connecting successive circular rims 104 with overlapping walls until it finally forms the lowest spinning fluid ring 119 connecting the rim 104 of the lowest cylinder 136 with the overlapping side wall 111, along which it descends to the denser fluid product outlet 109, through which it is finally withdrawn at a rate controlled by the denser fluid product outlet valve 110.

Meanwhile, the less dense fluid feed is introduced continuously into the lowest of the second conduits 102 through the less dense fluid feed inlet 115 at a rate controlled by the less dense fluid throttle valve 108, spun in the same circumferential direction as the spinning denser fluid feed by the lowest of the impellers 125 and 148 and propelled by them through the annular portion of that conduit 102 between the lowest of the cylinders 136 and the side wall 111 until it is intercepted by the lowest of the generally continuous spinning rings 119 of denser fluid connecting the rim 104 of that cylinder 136 with the overlapping side wall 111, whereby the two fluids interact to yield the final denser fluid product, continuously withdrawn through the denser fluid product outlet 109 to which it descends along the wall 111, and the initial less dense fluid product, separating centrifugally from the denser fluid product by spinning away from the side wall 111 in the upper portion of that conduit 102 until it enters, as the less dense fluid feed of the next unit in the series, the annular portion of the second conduit 102 of that unit, between the lowest of the baffles 140 and the lowest of the partitions 112.

The less dense fluid is then intercepted by the next spinning ring 119 of denser fluid, connecting the rim 104 at the bottom of the lowest partition 112 with the overlapping baffle 140, interacting therewith to yield the fluid products of that unit which also separate centrifugally from one another, with the denser fluid product spinning outward between the lowest of the impellers 137 and the less dense fluid product spinning inward until it rises through the circular opening 103 at the bottom of the lowest partition 112 into the conduit 101 on the upper side of that partition 112 and it is propelled, as the less dense fluid feed of the next higher unit in the series, by the next higher ring of impellers 125 and 148, through the annular portion of the conduit 102 of that unit and intercepted by the generally continuous spinning ring 119 of denser fluid connecting the rim 104 of the cylinder 136 of that unit with the overlapping side wall 111.

The less dense fluid continues to spin and to rise through successive spinning rings 119 of denser fluid, with each of which it interacts to be further altered until it eventually becomes the final less dense fluid product as it is separated centrifugally from the highest spinning ring 119 of denser fluid, connecting the rim 104 at the bottom of the highest partition 112 with the overlapping highest baffle 140, and spins inward therefrom until it rises through the circular opening 103 at the bottom of the highest partition 112 into the highest conduit 101 above that partition 112, from which it is continuously withdrawn through the less dense fluid product outlet 106 at a rate controlled by the less dense fluid throttle valve 108.

This apparatus is effective in the continuous separation of constituents of mixed fluids from one another by fractional distillation or solvent extraction. The mixed fluids are continuously introduced into an intermediate second conduit 102 beneath one of the intermediate partitions 112 through the mixed fluid feed inlet 143 and the narrow vertical slot 144 at a rate controlled by the mixed fluid feed valve 145. Because of the tangential configuration of the inlet 143 and the increase in velocity induced by its convergence into the slot 144, the mixed fluid feed will be directed along the side wall 111, against which it will spin around its vertical longitudinal axis along with the less dense fluid spinning in that part of that conduit 102 after having passed through the spinning ring 119 of denser fluid connecting the rim 104 of the cylinder 136 immediately below it with the side wall 111.

If the mixed fluids are to be separated by distillation, they are preferably introduced into the conduit 102 in the vapor phase, which will mix there with the more volatile fraction evaporated from the spinning fluid ring 119 connecting the rim 104 of the cylinder 136 with the side wall 111 below the slot 114, while the less volatile fraction spins downward from that ring 119 in the liquid phase in contact with the side wall 111 until it becomes the denser fluid feed entering the first conduit 101 of the next lower unit in the series along the upper surface of the next lower partition 112. Meanwhile the mixed vapors will spin inward from the slot 144 through the annular portion of that conduit 102 between the partition 112 and the baffle 140 until they are intercepted by the spinning ring 119 of liquid connecting the rim 104 at the bottom of the partition 112 with the overlapping baffle 140, from which the more volatile fraction will spin inward and upward in the vapor phase through the central outlet 103 to become the less dense fluid feed of the next higher unit of the apparatus while the less volatile fraction will be spun outward in the liquid phase through the first conduit 101 between the impellers 137 to form the spinning fluid ring 119 connecting the rim 104 of the cylinder 136 to the overlapping side wall 111.

The less volatile fraction from each successively lower spinning fluid ring 119 continues to spin its way generally outward and downward as a liquid of progressively lower volatility until it finally reaches the lowest of the first conduits 101, above the lowest of the disks 135, to form the lowest of the spinning fluid rings 119 connecting the rim 104 of the lowest of the cylinders 136 to the side wall 111, from which the liquid of lowest volatility continues its spinning downward path along the side wall 111 until it reaches the denser fluid product outlet 109, through which it is continuously withdrawn as the denser fluid product at a rate controlled by the denser fluid product outlet valve 110. It can then be continuously reheated in a reboiler (not shown in the drawing) from which the vapor can be continuously re-introduced into the conduit 102 through the less dense fluid feed inlet 115 at a rate controlled by the less dense fluid throttle valve 108.

The more volatile fraction from each successively higher spinning fluid ring 119 meanwhile continues to spin its way generally inward and upward as a vapor of progressively higher volatility until it finally passes through the highest of the spinning fluid rings 119 connecting the rim 104 at the bottom of the highest of the partitions 112 with the overlapping baffle 140, from which the vapor of highest volatility continues to spin generally inward and upward through the central outlet 103 at the bottom of the highest partition 112 until it reaches the less dense fluid product outlet 106, through which it is continuously withdrawn as the less dense fluid product at a rate controlled by the less dense fluid throttle valve 108. It can then be passed through a dephlegmator or reflux condenser (not shown in the drawing) from which the condensate can be continuously re-introduced into the highest of the first conduits 101 through the denser fluid feed inlet 113 at a rate controlled by the denser fluid feed valve 118.

When certain of the constituents of the mixed fluids are to be separated from one another by solvent extraction, both the denser and less dense fluid feeds (introduced separately through the inlets 113 and 115 respectively) will be liquids immiscible with one another. The mixed fluid feed introduced through the mixed fluid feed inlet 143 tangentially into the conduit 102 will spin around the vertical longitudinal axis thereof along with the less dense fluid product of the unit immediately beneath it as it spins inward and upward after passing through the spinning ring 119 of denser liquid connecting the rim 104 of the cylinder 136 with the side wall 111. The constituents of the mixed fluid feed that are soluble in the less dense liquid will dissolve in it, while the insoluble constituents will tend to be centrifugally separated from it, with the denser insoluble constituents spinning outward and downward toward the side wall 111, along which they will eventually join the denser liquid product from the spinning ring 119. The other constituents of the mixed fluid feed will be carried along with the less dense liquid, either in solution or suspension, through the annular portion of the conduit 102 between the partition 112 and the baffle 140 until it is intercepted by the spinning ring 119 of denser liquid connecting the rim 104 at the bottom of the partition 112 with the overlapping baffle 140, from which the less dense liquid, enriched by the constituents preferentially extracted from the denser liquid, will spin inward and upward through the central outlet 103 to become the less dense fluid feed of the next higher unit of the apparatus, while the denser liquid, enriched by the constituents preferentially extracted from the less dense liquid passing through the spinning ring 119, will be spun outward through the first conduit 101 between the impellers 137 to form the spinning ring 119 of denser liquid connecting the rim 104 of the cylinder 136 to the overlapping side wall 111.

The denser liquid product from each successively lower spinning ring 119 continues to spin its way generally outward and downward as it becomes progressively more enriched in the constituents preferentially soluble therein (besides carrying the denser or preferentially wet insoluble constituents in suspension) until it finally reaches the lowest of the first conduits 101, above the lowest of the disks 135, to form the lowest of the spinning rings 119 connecting the rim 104 of the lowest of the cylinders 136 with the side wall 111, from which the most enriched solution in the denser liquid reaches the denser fluid product outlet 109, through which it is continuously withdrawn as the denser fluid product at a rate controlled by the denser fluid product outlet valve 110.

The less dense liquid product from each successively higher spinning ring 119 meanwhile continues to spin its way generally inward and upward as it becomes progressively more enriched in the constituents preferentially soluble therein (besides carrying the less dense or preferentially wet insoluble constituents in suspension) until it finally passes through the highest of the spinning rings 119 connecting the rim 104 at the bottom of the highest of the partitions 112 to the overlapping baffle 140, from which the most enriched solution in the less dense liquid continues to spin generally inward and upward through the central outlet 103 at the bottom of the highest partition 112 until it reaches the less dense fluid product outlet 106, through which it is continuously withdrawn as the less dense fluid product at a rate controlled by the less dense fluid throttle valve 108.

The mixed fluid feed inlet 143 can also serve for the introduction of steam or other vapor to be condensed upon the surfaces of particulate matter in suspension in a gaseous less dense fluid to convert them into mist droplets to be captured by spinning rings 119 of scrubbing liquid, as described previously in connection with the apparatus shown in FIG. 2. Since the vapor pressure of mist droplets varies inversely with their diameter, the vapor will condense preferentially upon the largest particles present, making them grow larger while the smaller particles remain unwet. The use of a number of separate vapor inlets 143, each below a different partition 112, will enable the largest particles in suspension in each successive unit of the apparatus to be wet by condensation and captured by the spinning liquid ring 119 of that unit before the smaller particles are carried upward to the next higher unit in the series where the procedure can continue with the wetting and capture of the largest particles present in the unit.

Where the denser fluid feed comprises a stream of solid adsorbents or ion exchange resins, this apparatus can also serve for the countercurrent adsorption, desorption or ion-exchange of adsorbable or ionic constituents of the less dense fluid.

For some applications, the apparatus can function without a less dense fluid feed inlet 115, which can be closed off when the less dense fluid feed is produced in the lowest of the second conduits 102 in the form of a gas or vapor by the evaporation, degasification, desorption or pyrolysis there of a constituent of the denser fluid product spinning downward along the side wall 111 from the lowest of the spinning fluid rings 119. The energy required to produce the gas or vapor there would preferably be transmitted through the side wall 111 from an external medium, such as a fluid circulated through a jacket like the annular jacket 151 illustraded in FIG. 3.

In a multi-stage evaporator, the vapor (less dense fluid product) exhausted from the less dense fluid product outlet 106 of one stage can be condensed in the jacket 151 surrounding the conduit 102 of the next stage to provide the heat required to evaporate part of the denser fluid product there at a lower pressure.

In analogous applications, the apparatus can function without a denser fluid feed inlet 113, which can be closed off when the denser fluid feed is produced in the highest of the first conduits 101 in the form of a liquid by the condensation of its vapor spinning upward there in the less dense fluid product before it is exhausted through the less dense fluid product outlet 106. The heat of condensation would preferably be transmitted to a fluid coolant circulated through a cooling coil (not shown in the drawing) near the longitudinal axis of the first conduit 101 just within the mouth of the outlet 106.

Figure 5:
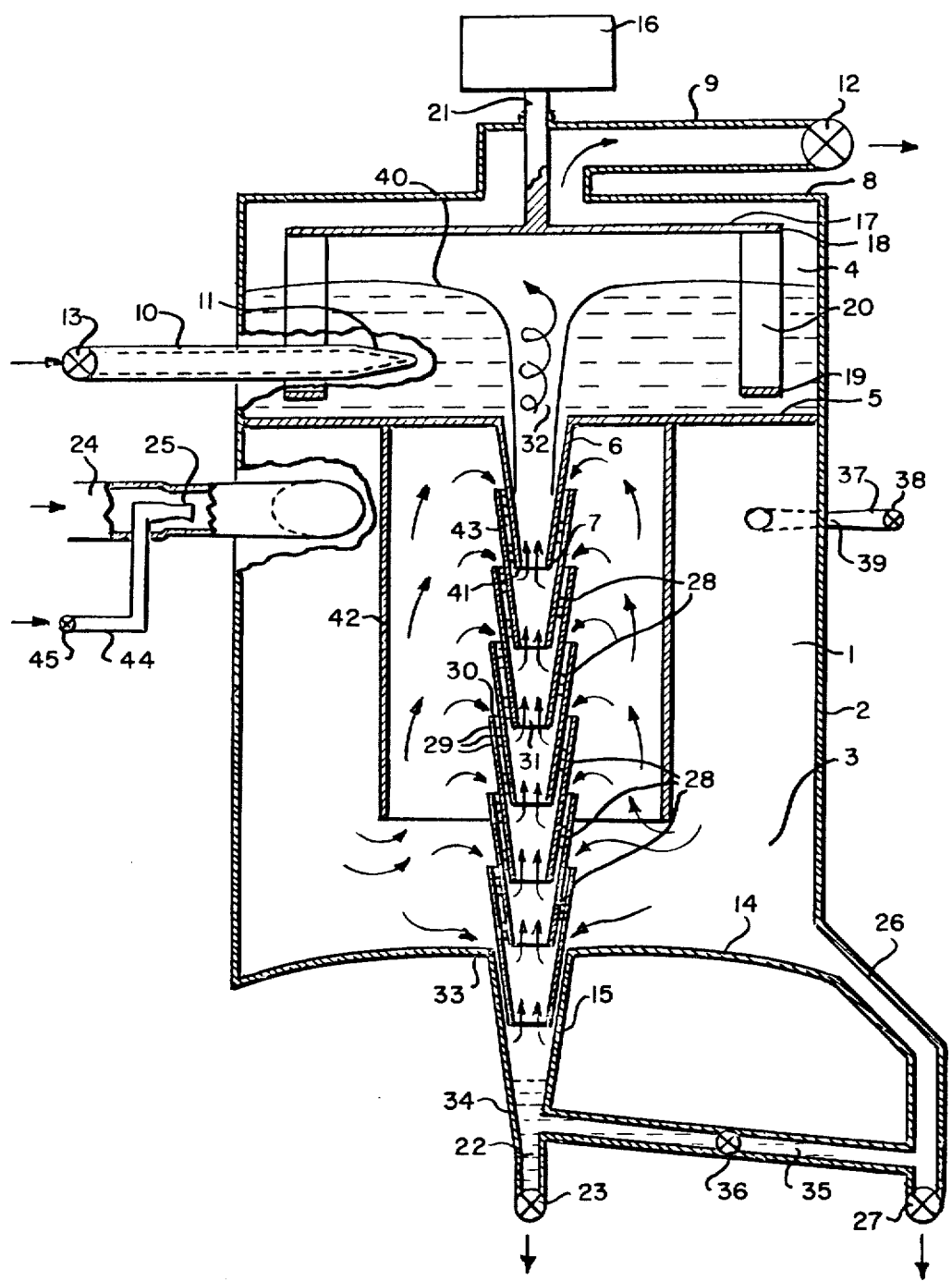
FIG. 5 shows, in partly schematic form, a partly cut away vertical elevation of a fifth embodiment of the invention.

Referring to FIG. 5, the apparatus comprises a generally cylindrical wall 2 defining a conduit 1 with a generally vertical longitudinal axis. The conduit 1 is divided into a lower chamber 3 and an upper chamber 4 by a generally transverse circular partition 5, the center of which is formed into a funnel 6, in the shape of the frustum of an inverted hollow cone, open at its throat 7 to provide a horizontal central circular orifice which becomes the sole means of communication between the two chambers.

The upper end of the upper chamber 4 is closed by the top 8, except for an effluent gas outlet 9 which penetrates the center of the top 8 and extends upward therefrom through a gaseous phase throttle valve 12.

One or more liquid phase inlets 10 are mounted tangentially to the cylindrical wall 2 and are directed therethrough into the upper chamber 4 in a generally horizontal direction. Each inlet 10 is preferably provided with a nozzle or orifice 11 to accelerate the velocity of the incoming liquid phase and a liquid feed valve 13 to regulate its rate of flow into the upper chamber 4. One or more of the inlets 10 can serve for the introduction of reagents or surfactants into the liquid phase.

A rotating impeller can optionally be installed in the upper chamber 4 as an alternative or supplementary means of spinning the liquid phase around its vertical longitudinal axis at a higher peripheral speed than that resulting from its optimum rate of flow through the tangential inlets 10. The impeller illustrated comprises a ring of vertical blades 20 secured to each other at their upper and lower ends by annular collars or yokes 18 and 19 respectively. The upper annular collar 18 is connected by radial spokes 17 to a vertical shaft 21, coaxial with the conduit 1, which extends through the center of the top 8 from the drive 16.

Below the partition 5, a gaseous phase inlet 24 is mounted tangentially to the wall 2 and directed therethrough into the lower chamber 3 in the same direction as the liquid phase inlets 10.

For certain applications, as in the scrubbing of particulate matter from the gaseous phase (see our U.K. patent specification No. 1,445,978), one or more vapour inlets 37 can also be mounted tangentially to the wall 2 and directed therethrough into the lower chamber 3 in the same direction as the gaseous phase inlet 24. There they can serve both to saturate the gaseous phase with vapour and to accelerate its velocity of spin without increasing its rate of flow in a longitudinal direction. Each inlet 37 would normally be connected through a separate vapour feed valve 38 and an appropriate nozzle 39 to control the rate of flow of the incoming vapour and to convert its pressure into velocity. A similar additional inlet 44 (controlled by a valve 45) could also be installed in the gaseous phase inlet 24 in the form of an ejector or a venturi scrubber 25, through which either a vapour or an evaporable liquid could be intimately mixed with the incoming gaseous phase to wet suspended particulate matter, especially by condensation thereupon from the vapour phase.

The lower end of the lower chamber 3 is closed by the bottom 14 which is preferably dished upward with its center above its outer edge, which is penetrated by a sludge outlet 26 extending outward and downward through a sludge valve 27.

The center of the bottom 14 is penetrated by a funnel 15, generally identical to and coaxial with the funnel 6, which converges downward from its circular mouth 33 at the center of the bottom 14 to its circular throat 34, leading through an effluent liquid outlet 22 to an effluent liquid valve 23. A liquid overflow line 35 connects the sludge outlet 26 with the effluent liquid outlet 22 through the liquid overflow valve 36.

The apparatus can be built so that the space between the outside surface of the funnel 6 and the inside surface of the funnel 15 is narrow enough to permit the formation of a generally continuous liquid curtain 41 by the descending liquid phase as it spins outward and downward from the lower edge of the throat 7 to screen the outlet from the passage between the two funnels through which the spinning gaseous phase is made to flow inward and downward from the lower chamber 3 before it can rise through the throat 7 toward the upper chamber 4.

However, as shown in FIG. 5, the capacity and effectiveness of the apparatus can be increased and the longitudinal velocity of the gaseous phase passing through the spinning liquid curtain 41 reduced by increasing the distance between the funnels 6 and 15 and inserting between them a number of generally identical frustoconical funnels 28 to provide an equal number of additional parallel passages 43 through which the gaseous phase can flow from the lower chamber 3 through an equal number of additional liquid curtains 41 on its way to the upper chamber 4. Thus the distance between any two adjacent funnels can be kept short enough to maintain the continuity of the spinning liquid curtains 41 across the passages 43 between the funnels while the total area across all the passages can be increased to whatever extent is required to reduce the downward velocity of the gaseous phase emerging from the passages 43 to its optimum level. It is preferable for the vertical length of each of the funnels 28 to be slightly longer than that of the one immediately above it in order to make the diameter of each of their throats 31 progressively narrower as they approach the funnel 15.

Each of the funnels 28 is separated from the funnel next above it by one or more spiral or helical guides 29. The pitch of each of the guides 29 preferably diminishes progressively downward to provide convergent helical passages 43 with nearly horizontally directed outlets through which the gaseous phase can be made to spin faster and faster as it flows from the lower chamber 3 between the funnels in a generally downward and inward direction from the mouth 30 of one funnel 28 toward the throat 31 of the funnel next above it. Each guide 29 may either be an integral part of a funnel 28 or a separate strip, preferably of a foamed or hollow elastomer, or a rope of flexible fibers secured between each pair of adjacent funnels.

FIG. 6 illustrates, on a larger scale, and in greater detail, an adjacent pair of funnels 28, showing their mouths 30, their throats 31, the helical guide 29 between them and the liquid curtain 41 spinning outward and downward from the lower edge of the throat 31 of the upper funnel across the passage 43 between the two funnels to the inner surface of the lower funnel.

A cylindrical baffle 42, coaxial with the conduit 1, is shown in FIG. 5 extending downward into the lower chamber 3 from the lower surface of the partition 5. It can serve both to distribute the flow of the gaseous phase more nearly equally among the passages 43 and to keep centrifugally separable particulate matter away from them.

In operation, the liquid phase is introduced continuously into the upper chamber 4 through the liquid phase inlet 10 and the orifice 11 at a rate controlled by the liquid feed valve 13. Because of the tangential configuration of the liquid phase inlet 10 and the increase in the inlet velocity induced in the liquid phase by the orifice 11, the incoming liquid phase will be directed along the inside of the wall 2, against which it will spin around the longitudinal vertical axis of the upper chamber 4 fast enough to form a free vortex with a surface 40 approaching the vertical at the throat 7.

If the inlet velocity of the liquid phase emerging from the orifice 11 is too low to spin the liquid phase in the upper chamber 4 fast enough by itself, it can be made to spin faster by the rotation of the impeller blades 20, which would otherwise not be required.

After enough of the liquid phase has been introduced into the upper chamber 4 to narrow the inner diameter of the vortex surface 40 to that of the throat 7, the spinning liquid phase will overflow the edge of the throat 7, and spin radially outward and downward across the passage 43 between the outer surface of the funnel 6 and the inner surface of the highest of the funnels 28 in the form of a generally continuous annular liquid curtain 41 which screens the outlet of the passage 43.

The descending liquid phase continues to spin along the inner surface of the highest of the funnels 28 along which it continues its descent until it overflows its throat 31 and spins radially outward and downward to form a second generally continuous liquid curtain 41 across the outlet of the passage 43 between the highest and next highest of the funnels 28.

The spinning liquid phase continues downward to overflow the throats 31 of successively lower funnels 28 and to form generally continuous liquid curtains 41 across the outlets of each of the passages 43 between them until it finally overflows the throat 34 of the funnel 15 and is continuously discharged through the effluent liquid outlet 22 at a rate regulated by the effluent liquid valve 23.

Meanwhile the gaseous phase is introduced continuously through the gaseous phase inlet 24 into the lower chamber 3 at a rate controlled by the gaseous phase throttle valve 12. Because of the tangential configuration of the gaseous phase inlet 24 the gaseous phase is spun around the vertical longitudinal axis of the lower chamber 3 in the same direction as the spinning liquid phase. If its initial velocity of spin is not fast enough, it can be accelerated by the continuous tangential introduction of vapour at a higher velocity through one or more vapour inlets 37 and their appropriate nozzles 39 at rates controlled by their vapour feed valves 38. The vapour can either be that of one of the constituents of the liquid phase or another condensible vapour or gas either soluble in the liquid phase or which will react in the apparatus to form one or more products which are so soluble.

When the apparatus is to serve as a scrubber to separate suspended particulate matter from the gaseous phase, it can be made more effective if the weight of those solid particles which are not heavy enough to be readily separated centrifugally is first augmented by their transformation into mist droplets through the condensation upon their surfaces of the vapour of one of the constituents of the liquid phase. This can be accomplished in the lower chamber 3 by supersaturating the spinning gaseous phase there with this vapour by introducing it in the vapour phase either through a vapour inlet 37 or into the gaseous phase inlet 24 through the ejector 25. The same result can be achieved by evaporating it from the liquid phase in the relatively warmer peripheral portion of the spinning gaseous phase in the lower chamber 3 and condensing it from the vapour phase upon the suspended particles as they become cooled below the dew point by the adiabatic expansion of the gaseous phase as it is being accelerated during its radially inward flow both in the free vortex and the convergent helical passages 43. The liquid phase to be evaporated for this purpose is preferably introduced into the gaseous phase inlet 24 through the venturi scrubber 25, which would also serve to wet the larger particles and permit them to be separated centrifugally in the lower chamber 3, but could alternatively be introduced directly into the peripheral portion of the lower chamber 3 through a vapour inlet 37, preferably at a higher temperature than that introduced into the upper chamber 4 through a liquid phase inlet 10.

The suspended particulate matter that is heavy enough to be separated centrifugally will be spun against the wall 2, along which it will fall, together with part of the liquid phase either condensed within or introduced into the lower chamber 3, toward the sludge outlet 26, where the heavier sludge will be removed through the sludge valve 27 while the excess liquid phase will overflow through the liquid overflow line 35 into the effluent liquid outlet 22 at a rate regulated by the liquid overflow valve 36.

Meanwhile, the spinning gaseous phase, saturated with the vapour phase and carrying both suspended mist droplets and unwet particulate matter not heavy enough to be centrifugally separated, flows downward from the gaseous phase inlet 24 to a level below that of the lower edge of the cylindrical baffle 42 before flowing in a generally radially inward direction toward the mouths 30 of the funnels 28, where it enters the convergent helical passages 43 formed by the guides 29 between the funnels 28. Here its velocity of spin increases to a maximum and the consequent generally adiabatic expansion reduces its temperature to condense vapour both upon existing mist droplets and previously unwet particulate matter until it is forced to pass through the generally continuous liquid curtains 41, which screen the outlets of the passage 43, before it can rise through the throat 7 into the upper chamber 4. There it continues to spin in contact with the surface 40 of the spinning vortex of the coldest freshest liquid before finally being discharged through the effluent gas outlet 9 at a rate controlled by the gaseous phase throttle valve 12.

Since the velocity of spin and centrifugal acceleration of both the gaseous and liquid phases are at their maximum at the outlets of the helical passages 43 where the gaseous phase passes through the generally continuous liquid curtains 41, while the relative motion in a circumferential direction between the gaseous and liquid phases is comparatively insignificant, the entrainment of mist by the gaseous phase breaking through the liquid curtain 41 can be prevented so long as the centrifugal force applied to the inner surface of each spinning liquid curtain 41 is kept greater than the frictional drag upon it by the escaping gaseous phase. By regulating the flow of the gaseous phase through the gaseous phase throttle valve 12, its velocity of escape from the spinning surfaces of the liquid curtains 41 can be maintained at a level where not only no entrainment of mist occurs but mist droplets and even previously unwet particulate matter already suspended in the gaseous phase are captured and carried away from it by the spinning liquid phase. For the same reason foams already in suspension in the liquid phase are broken up in the spinning liquid curtains 41 by the gaseous phase passing through them and their gas content carried off as part of the gaseous phase.

The embodiment of the apparatus shown in FIG. 7 comprises a vessel with a wall 211, having a circular transverse section and a vertical longitudinal axis, open at both ends to provide a less dense fluid feed inlet 215 at one end and a less dense fluid product outlet 206 at the other end. The wall 211 extends cylindrically from the inlet 215 to a point above the moving parts of the invention and then it converges inward between the cylindrical portion and the outlet 206.

A rotor generally indicated by the numeral 212, with a circular transverse section coaxial with the wall 211, divides the space within the wall 211 into two coaxial conduits, a first conduit 201 generally within the rotor 212 and a second conduit 202 generally surrounding the rotor 212.

The rotor 212 comprises two substantially horizontal disks 235, 238; the lowermost disk 235 is attached at its center perpendicularly to a hollow shaft 246. The two disks 235, 238 are attached at their outer edge to coaxial rotor walls 236, 249 with circular transverse sections. The annular space between the rotor walls 236, 249 is open at its end opposite its juncture with the disks to provide the first conduit 201 with an outlet 203 with a circular rim 204. An annular passage between the rotor wall 236 and the wall 211 defines a portion of the second conduit 202. The shaft 246 is supported by bearings 234 and is rotated around its vertical axis by a drive 232.

A liquid feed inlet 213 surrounds and is rotatably and sealably connected to shaft 246. The conduit channel within the shaft 246 is in turn connected to the first conduit 201.

A denser fluid product outlet 209 penetrates the wall 211 at its base near the inlet 215 and extends downward from the second conduit 202, preferably tangentially through a denser fluid product outlet valve 210.

A ring of radial impellers 225, each extending radially outward from a point radially outward from the gas inlet 215, is attached to the outside of rotor wall 236 and extends below disk 235. Their function is to draw the gaseous feed from the inlet 215 into the second conduit 202 and to spin it radially outward into the annular portion of the second conduit 202 between the rotor wall 236 and the wall 211.

A similar ring of radial impellers 237 is mounted on the opposite side of the disk 235 to spin the denser fluid feed from the shaft 246 through the first conduit 201 toward the rotor wall 236.

A ring of axial impellers 248, preferably in the form of helical vanes connected to the ends of the radial impellers 225 and curved outward to spin the contents of the annular portion of the second conduit 202 faster than the spin of the vanes themselves, is mounted on the outside of the rotor wall 236.

A similar ring of axial impellers 247 is mounted on the inside of the rotor wall 236 to accelerate the spin of the denser fluid feed in the first conduit 201. In an alternative embodiment the first conduit 201 includes the entire central area within walls 236, by eliminating the upper disk 238 and inner rotor wall 249.

The upper disk 238 and inner rotor wall 249 do, however, enable the spinning impellers 237 and 247 to draw the liquid feed upward through the inlet 213 and the hollow vertical shaft 246 in the absence of an external head. This function is particularly valuable when all or part of the denser fluid product discharged through the outlet 209 is recycled as the denser fluid feed introduced through the inlet 213 as, for example, in the scrubbing of particulate matter by water from air.

In operation, the apparatus shown in FIG. 7 is analogous to that described in FIG. 3, the differences being that the apparatus of FIG. 7 is operated vertically with a liquid and a gas and the liquid is continuously introduced into the first conduit 201 through shaft 246.

For certain applications, as in the scrubbing of particulate matter from the gaseous phase (see our U.K. patent specification No. 1,445,978), a condensible vapor inlet 260 could be installed in the gaseous phase inlet 215. The vapor would condense on the particulate matter in the gaseous phase forming combined solid-liquid particles which are heavier and more easily removable from the gaseous phase. The vapor could be produced in heater 261 from a supply of liquid obtained through a bypass from the denser fluid feed inlet 213, and regulated by valve 262. Alternatively, the heater 261 could perform the same function if it were located in the lower part of the second conduit 202 near the wall 211.

Even though the denser fluid feed in this embodiment is a liquid, the denser fluid product can still comprise a stream of finely divided solids, formed by the interaction of the liquid and gaseous feeds in the second conduit 202. For example, where the liquid feed is a liquid hydrocarbon and the gaseous feed is oxygen, the combustion of part of the hydrocarbon by the oxygen can yield enough heat to effect the pyrolysis of another part into carbon black and hydrogen. A gaseous hydrocarbon can initially be mixed into the gaseous feed (either by having the heater 261 vaporize part of the liquid feed or otherwise) until ignition takes place and the combustion becomes self-sustaining. The carbon black would be continuously discharged through the denser fluid product outlet 209 while the mixture of hydrogen and carbon monoxide exhausted through the less dense fluid product outlet 206 could serve as the raw materials for a subsequent synthesis.

Figure 8:
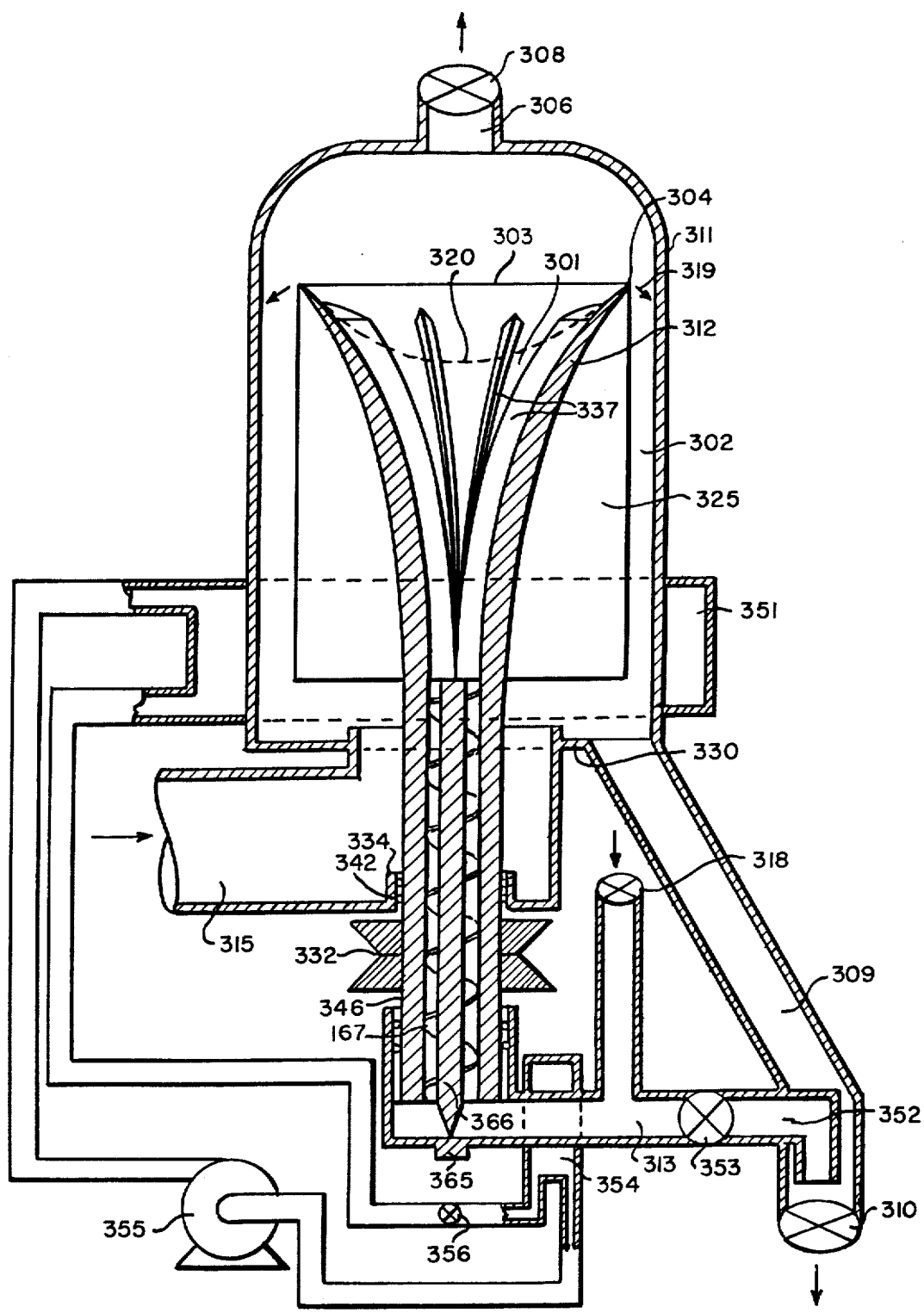
FIG. 8 shows, in partly schematic form, a partly cut away vertical elevation of a seventh embodiment of the invention, in which the denser fluid product can be recycled to serve again as the denser fluid feed.

The apparatus illustrated in FIG. 8 comprises a wall 311, with a generally circular transverse section and a vertical longitudinal axis, enclosing a space divided by a coaxial hollow rotor 312 (also with a generally circular transverse section) into two coaxial conduits, a first conduit 301 generally surrounded by the rotor 312 and a second conduit 302 outside of the rotor 312.

The rotor 312, open at both ends, takes the form at its lower end of a cylindrical shaft 346, from which it diverges toward its upper end 303, with a circular rim 304, the open upper end 303 serving as an outlet from the first conduit 301 into the coaxial second conduit 302. The lower end of the hollow shaft 346 is open to a denser fluid feed inlet 313, which is fed through a denser fluid feed valve 318. A driver 322 is mounted on the hollow cylindrical shaft 346 to spin the rotor 312 about its vertical longitudinal axis, while the inner wall of the shaft 346 is attached to the outer edge of a helical impeller or screw feeder 367 with a vertical axle 366, coming to a point at its lower end at which the weight of the rotor 312 is supported by the bearing 365. The rotor 312 is also kept in position by bushings 334, each enclosing seals 342. Longitudinal ribs or impellers 337 extend inward from the inner side of the rotor 312 to spin the contents of the first conduit 301 about its vertical longitudinal axis while longitudinal fins or impellers 325 extend outward from the outer side of the rotor 312 to spin the contents of the second conduit 302. Both the impellers 337 and 325 are preferably generally triangular in cross section, pointed away from the rotor 312.

The upper end of the wall 311 converges upward towards its upper end, where the second conduit 302 opens into a less dense fluid product outlet 306, extending upward from the top of the wall 311, through a less dense fluid throttle valve 308.

The lower end of the wall 311 is closed by a circular bottom 330, which is penetrated at its center by a less dense fluid feed inlet 315 and at its outer edge by a denser fluid product outlet 309, extending downward (and preferably tangentially outward) from the bottom 330 through a denser fluid product outlet valve 310.

Where all or a part of the denser fluid product is to be recirculated as all or a part of the denser fluid feed, a denser fluid product recirculation line 352 can be installed to connect the denser fluid product outlet 309 to the denser fluid feed inlet 313, preferably through a recirculation control valve 353.

Whenever energy is to be transferred between the second conduit 302 and an external medium, an annular jacket 351 around the wall 311 can serve for the circulation therethrough of a heating or cooling medium. Similarly, when energy is to be transferred between an external medium and the denser fluid feed to be introduced into the first conduit 301, a heating or cooling medium can be circulated through an annular jacket 354 around the denser fluid feed inlet 313. Furthermore, the jackets 351 and 354 can be linked together by a heat pump, comprising a compressor 355 and an expansion valve 356, whereby a single refrigerant can serve both to cool the denser fluid feed inlet 313 by evaporation in the jacket 354 and to heat the contents of the second conduit 302 by condensation at a higher pressure in the jacket 351.

In operation, the denser fluid feed is introduced continuously through the denser fluid feed inlet 313 at a rate controlled by the denser fluid feed valve 318. Meanwhile, the rotor 312 with its hollow vertical shaft 346 is spun around its vertical axis by the drive 332 fast enough for the impellers 367 and 337 to spin the denser fluid feed and lift it from the denser fluid feed inlet 313 through the hollow shaft 346 to form a vortex within the spinning first conduit 301.

After enough of the denser fluid feed has been drawn into the first conduit 301 to raise the outer edge of the vortex surface 320 to the level of the outlet 303, the spinning denser fluid feed will overflow the circular rim 304 and spin radially outward and downward through the second conduit 302 in the form of a generally continuous spinning fluid ring 319 connecting the circular rim 304 with the overlapping wall 311, thereby curtaining off the upper portion of the second conduit 302 from the annular lower portion thereof below the rim 304.

Meanwhile the rotation of the impellers 325, attached to the outer surface of the rotor 312, draws the less dense fluid feed continuously through the less dense fluid feed inlet 315 at a rate controlled by the less dense fluid throttle valve 308 and spins the less dense fluid feed around the annular lower portion of the second conduit 302 in the same direction as the spinning denser fluid ring 319 emerging from the first conduit 301 and curtaining off the upper portion of the second conduit 302 from the annular lower portion thereof at the rim 304.

The spinning less dense fluid feed flowing generally upward through the annular lower portion of the second conduit 302 must consequently be intercepted by the generally continuous spinning ring 319 of denser fluid, whereby the fluid feeds will interact with one another, while spinning in the same direction, to yield immiscible fluid products differing in density from one another. The spinning fluid products will separate centrifugally from one another in the second conduit 302, with the less dense fluid product spinning inward and upward toward the less dense fluid product outlet 306, through which it is continuously withdrawn at a rate controlled by the throttle valve 308, while the denser fluid product spins outward and downward along the wall 311 into the denser fluid product outlet 309, through which it is continuously withdrawn at a rate controlled by the denser fluid product outlet valve 310.

A significant difference between this embodiment and that illustrated in FIG. 1 is the extensive axial countercurrent contact between the less dense fluid feed and the denser fluid product as they spin together around the annular lower portion of the second conduit 302 before the less dense fluid has passed through the spinning fluid ring 319. Also, unlike the first embodiment, there is very little contact between the denser fluid feed and the less dense fluid product after the less dense fluid product rises above the spinning fluid ring 319. On the other hand, in the first embodiment, there is no contact between the less dense fluid feed and the denser fluid product before the less dense fluid feed is intercepted by the spinning fluid ring 119, while the less dense fluid product rising from the spinning ring 119 through the first conduit 101 becomes subject there to considerable axial countercurrent contact with the denser fluid feed spinning downward through the first conduit 301.

Where the less dense fluid feed is a suspension of particulate matter in a gaseous carrier and the denser fluid feed is an aqueous or other liquid (preferably containing a wetting agent) serving to scrub the particulates therefrom, the effectiveness of the apparatus in the removal of particulates too tiny to be separated centrifugally or wet by contact with the scrubbing liquid can be augmented by circulating a hot fluid through the jacket 351. This can heat the scrubbing liquid spinning along the wall 311 so that enough of that liquid can be made to evaporate there to supersaturate the spinning gaseous feed with its vapor as the relatively cold gaseous feed rises past the heated liquid. This vapor will condense directly from the vapor phase upon the surfaces of the relatively cold suspended particles, not only increasing their weight to make them more easily separable centrifugally but also wetting the previously dry particles to convert them ino mist droplets more easily captured by the spinning ring 319 of scrubbing liquid.

Where the gaseous carrier is air and the scrubbing liquid is water, it is often feasible to recirculate the water from the denser fluid product outlet 309 to the denser fluid feed inlet 313 through the denser fluid product recirculation line 352 by opening the recirculation control valve 353 and closing the denser fluid product outlet valve 310 enough to limit the discharge through it to the amount of water required to carry away the sludge of scrubbed particulate matter.

When the wash water is recirculated, the heat added to it from the hot fluid in the jacket 351 may raise its temperature so much that the scrubbed air emerging from the less dense fluid product outlet 306 may become warmer and more humid than required. The temperature and moisture content of the scrubbed air can then be reduced by cooling the recirculating wash water by the evaporation of a refrigerant in the jacket 354. By compressing the refrigerant vapor in the compressor 355, the condensation of that refrigerant vapor in the jacket 351 can provide the heat required there to supersaturate the particulate-bearing air rising through the second conduit 302 with the vapor of the wash water descending along the wall 311. In the summertime, it will often be possible to close the denser fluid feed valve 318, except when wetting agents are added through it, because the moisture condensed from the cooling and consequent dehumidification of the air passing through the spinning ring 319 of chilled wash water will provide more than enough water to carry the sludge of scrubbed particulate matter through the denser fluid product outlet valve 310.

Where the denser fluid feed comprises a stream of finely divided solids (either alone or suspended in a liquid or gaseous carrier), this apparatus can serve for their combustion, pyrolysis, hydrogenation, halogenation or other reaction, depending upon the nature of the less dense fluid feed. For example, if the denser fluid feed comprises a stream of finely divided coal, sawdust, or other organic solids and the less dense fluid feed inlet 315 is entirely closed off, the circulation of a hot enough fluid through the jacket 351 could effect the continuous pyrolysis of the organic matter in the second conduit 302, with the volatile products continuously exhausted through the less dense fluid product outlet 306 and the ash continuously discharged through the denser fluid product outlet 309. If a limited amount of oxygen is admitted through the less dense fluid inlet 315, the energy required for the pyrolysis can be supplied by the partial combustion of the organic matter in the second conduit 302 and no heat need be transferred from the jacket 351. If complete combustion is required instead of pyrolysis, the less dense fluid feed inlet 315 can take the form of a central annular opening through the bottom 330, directly from the atmosphere into the second conduit 302, and the jacket 351 can take the form of a boiler to absorb the heat of combustion. The finely divided solid feed could be introduced in the form of a slurry in a liquid better able to scrub particulate matter from the gaseous combustion products before being evaporated or burned with the solid feed in the second conduit 302.

Carbon black can similarly be produced in this apparatus by the pyrolysis of a liquid hydrocarbon serving as the denser fluid feed. If the less dense fluid feed inlet 315 is entirely closed off, the circulation of a hot enough fluid through the jacket 315 can effect the continuous evaporation and pyrolysis of the liquid hydrocarbon to form carbon black as the denser fluid product and hydrogen as the less dense fluid product which can be scrubbed of gaseous hydrocarbons and suspended particles of carbon black as it passes through the generally continuous spinning ring 319 of liquid hydrocarbons. If a limited amount of oxygen is admitted through the less dense fluid inlet 315, the energy required for the pyrolysis can be supplied by the partial combustion of the hydrocarbon in the conduit 302 and no heat need be transferred from the jacket 351. On the contrary, it may sometimes be preferable to cool the liquid hydrocarbon feed (through the jacket 354 or by locating the jacket 351 aroung the spinning liquid ring 319) to enable the spinning ring 319 to remain liquid long enough to scrub the suspended carbon particles from the gaseous combustion products. These gaseous combustion products, continuously exhausted through the less dense fluid product outlet 306, will comprise mainly carbon monoxide and hydrogen which can serve as the raw materials for various subsequent types of syntheses.

This apparatus can also serve for the continuous production of metal powders or other finely divided solids when the solids are melted before being introduced into the apparatus in the liquid phase as the denser fluid feed and solidified there by contact with a colder inert gas (argon, for example) serving as the less dense fluid feed. By keeping the gap between the rim 304 and the wall 311 wide enough to permit all the molten material in the spinning ring 319 to solidify before reaching the wall 311, the solid metal or other material will be produced in the form of generally uniform spherical particles. This illustrates how the denser fluid in the spinning fluid ring 319 can be transformed, during the course of its passage from the rim 304 to the wall 311, from a sheet of liquid to a stream of finely divided solid particles.

The solid particles produced by this method can be made more uniform in composition than those prepared by older methods because the spherical molten droplets resulting from the interaction of the spinning fluids tend to solidify before any significant portion of each individual droplet has time to separate from its initial structure. This is particularly important in the case of metal alloys or other solids that can exist in more than one crystalline state. Metal alloy structures therefore can often be made stronger when synthesized from powders made in this way than by casting the same structure from the molten metal.

I claim:

1. A process for the continuous contact of a denser fluid feed with a less dense fluid feed and the subsequent separation of a resultant denser fluid product from a less dense immiscible fluid product, the process comprising:

(a) introducing the denser fluid feed into an inner conduit, having a generally circular transverse section surrounding a central longitudinal axis, the conduit being open at one end to provide an outlet with a generally circular rim, centered upon the longitudinal axis of the conduit, (b) directing the flow of the denser fluid feed through the inner conduit axially toward and through the outlet therefrom into a coaxial outer conduit, also having a generally circular transverse section, overlapping the inner conduit around and beyond the said circular rim, thus defining a generally annular section within the outer conduit where the inner conduit is overlapped thereby and a free section beyond the overlapped rim of the inner conduit, the said overlapped rim defining the outlet of the generally annular section, (c) spinning the denser fluid feed around the longitudinal axis of the inner conduit fast enough to form the denser fluid feed emerging from the outlet of the inner conduit into a spinning denser fluid ring connecting the overlapped rim of the inner conduit with the overlapping outer conduit, thereby curtaining off the outlet of the generally annular section from the free section of the outer conduit, (d) introducing the less dense fluid feed into and through the generally annular section of the outer conduit and thence into the free section thereof through the outlet of the generally annular section curtained off by the spinning denser fluid ring, whereby the less dense fluid feed must be intercepted by the spinning denser fluid ring, the fluid feeds consequently interacting with one another within the outer conduit to yield immiscible fluid products differing in density from one another, the spinning fluid products separating centrifugally from one another with the less dense fluid product flowing toward an inner space closer to the longitudinal axis than the surrounding denser fluid product, (e) withdrawing the less dense fluid product from the said inner space and (f) separately withdrawing the denser fluid product from the outer conduit.

2. A process as claimed in claim 1, in which at least part of the spinning of the denser fluid feed results from spinning the less dense fluid feed around the longitudinal axis of the conduits before the fluid feeds interact with one another.

3. A process as claimed in either of claims 1 or 2, in which at least part of the spinning of the denser fluid feed results from the introduction into either conduit of a vapour in a generally circumferential direction at a higher velocity in that direction than that of the fluid in that conduit.

4. A process as claimed in claim 1, in which the denser fluid feed is spun within the inner conduit while the less dense fluid feed is spun in the same circumferential direction in the generally annular section of the outer conduit.

5. A process as claimed in claim 1, in which energy is transferred from one fluid feed into the other fluid feed.

6. A process as claimed in claim 1, in which energy is transferred between at least one of the interacting fluids and an external medium.

7. A process as claimed in claim 1, in which at least one constituent of one fluid feed reacts chemically with at least one constituent of the other fluid feed.

8. A process as claimed in claim 7, in which the chemical reaction is exothermal enough to pyrolyse at least one constituent of either fluid feed.

9. A process as claimed in claim 1, in which at least one constituent of the denser fluid feed becomes at least part of the less dense fluid product.

10. A process as claimed in claim 9, in which at least part of a particulate solid phase comprised in the denser fluid feed is carried into suspension by another fluid phase to become at least part of the less dense fluid product.

11. A process as claimed in claim 10, in which at least part of a particulate solid phase comprised in the denser fluid feed is dissolved in a liquid phase to become at least part of the less dense fluid product.

12. A process as claimed in claim 10, in which at least part of a particulate solid phase comprised in the denser fluid feed reacts chemically to form a gaseous phase which becomes at least part of the less dense fluid product.

13. A process as claimed in claim 9, in which at least part of a liquid phase comprised in the denser fluid feed is evaporated to a vapour phase which becomes at least part of the less dense fluid product.

14. A process as claimed in claim 1, in which at least one constituent of the less dense fluid feed becomes at least part of the denser fluid product.

15. A process as claimed in claim 14, in which at least part of a vapour phase comprised in the less dense fluid feed is condensed to a liquid phase which becomes at least part of the denser fluid product.

16. A process as claimed in claim 1, in which at least one constituent of one fluid feed is fissile and at least one constituent of the other fluid feed is capable of accelerating the rate of nuclear fission in the fissile constituent.

17. A process as claimed in claim 1, in which at least one of the fluid feeds comprises a gaseous phase.

18. A process as claimed in claim 1, in which at least one of the fluid feeds comprises a liquid phase.

19. A process as claimed in claim 18, in which each of the fluid feeds comprises a liquid phase.

20. A process as claimed in claim 18, in which the liquid phase dissolves at least one constituent of the other fluid feed.

21. A process as claimed in claim 18, in which the liquid phase contains a surfactant.

22. A process as claimed in claim 21, in which the particulate solid phase is capable of serving as a catalyst to accelerate a chemical reaction between at least two constituents of the interacting fluids.

23. A process as claimed in claim 1, in which at least one of the fluid feeds comprises a particulate solid phase.

24. A process as claimed in claim 23, in which the particulate solid phase is capable of adsorbing at least one constituent of the other fluid feed.

25. A process as claimed in claim 23, in which the particulate solid phase is capable of ion exchange with at least one constituent of the other fluid feed.

26. A process as claimed in claim 23, in which the particulate solid phase is transferred from a suspension thereof in a gaseous less dense fluid feed into suspension in a liquid phase comprised in the denser fluid feed.

27. A process as claimed in claim 26, in which at least part of the particulate solid phase is wet by a liquid before its transfer to the liquid phase.

28. A process as claimed in claim 27, in which the liquid wetting the particulate solid phase is formed by the condensation of a vapor directly from the vapour phase upon the surface of the particulate solid phase.

29. A process as claimed in claim 1, in which the longitudinal axis of the conduits is generally vertical.

30. An apparatus for the continuous contact of a denser fluid feed with a less dense fluid feed and the subsequent separation of a resultant denser fluid product from a less dense immiscible fluid product, the apparatus comprising:

(a) an inner conduit, having a generally circular transverse section surrounding a central longitudinal axis, the conduit being open at one end to provide an outlet with a generally circular rim, centred upon the longitudinal axis of the conduit, (b) a coaxial outer conduit, also having a generally circular transverse section, overlapping the inner conduit around and beyond the said circular rim, thus defining a generally annular section within the outer conduit where the inner conduit is overlapped thereby and a free section beyond the overlapped rim of the inner conduit, the said overlapped rim defining the outlet of the generally annular section, (c) means for introducing the denser fluid feed into the inner conduit, (d) means for directing the flow of the denser fluid feed through the inner conduit axially toward and through the outlet therefrom into the overlapping outer conduit, (e) means for spinning the denser fluid feed around the longitudinal axis of the inner conduit fast enough to form the denser fluid feed emerging from the outlet of the inner conduit into a spinning denser fluid ring connecting the overlapped rim of the inner conduit with the overlapping outer conduit, thereby curtaining off the outlet of the generally annular section from the free section of the outer conduit, (f) means for introducing the less dense fluid feed into and through the generally annular section of the outer conduit and thence into the free section thereof through the outlet of the generally annular section curtained off by the spinning denser fluid ring, (g) an outlet for a resultant less dense fluid product from a location into which it is spun centripetally inward from the spinning fluid ring, and (h) a separate outlet for a resultant denser fluid product from the outer conduit.

31. An apparatus as claimed in claim 30, in which at least part of the means for spinning the denser fluid feed comprises means for spinning the less dense fluid feed around the longitudinal axis of the conduits before the fluid feeds interact with one another.

32. An apparatus as claimed in claim 31, in which the inner conduit is capable of rotation around its longitudinal axis and at least one impeller to spin the less dense fluid feed extends therefrom into the generally annular section of the outer conduit.

33. An apparatus as claimed in claim 32, in which the inner conduit comprises a bowl, coaxially mounted upon a rotatable shaft.

34. An apparatus as claimed in claim 33, in which the shaft is hollow and opens into the bowl to comprise at least part of the means for introducing the denser fluid feed into the inner conduit.

35. An apparatus as claimed in claim 33, in which the inner conduits of successive units in a series are coaxially mounted on a single rotatable shaft.

36. An apparatus as claimed in claim 31, in which at least two units of the apparatus are connected in series with one another, whereby the less dense fluid product separated from the spinning denser fluid ring of the first unit in such a series is introduced into the generally annular section of the outer conduit of the second unit while the denser fluid product separated from the spinning denser fluid ring of the second unit is introduced into the inner conduit of the first unit.

37. An apparatus as claimed in claim 30, in which means are provided for spinning the less dense fluid feed, within the generally annular section of the outer conduit, around the longitudinal axis in the same circumferential direction as the spin of the denser fluid feed.

38. An apparatus as claimed in claim 37, in which means are also provided within the inner conduit for spinning the denser fluid feed around the longitudinal axis in the same circumferential direction as the spin of the less dense fluid feed.

39. An apparatus as claimed in claim 30, in which at least one inlet for the vapor of at least one constituent of the denser fluid product is provided into the generally annular section of the outer conduit.

40. An apparatus as claimed in claim 39, in which the inlet is directed into the annular section in a direction to accelerate the spin of the less dense fluid around the longitudinal axis of the conduits.

41. An apparatus as claimed in claim 30, in which means are provided for the interchange of energy between at least one of the interacting fluids and an external medium.

42. An apparatus as claimed to claim 30, in which the longitudinal axis of the conduits is generally vertical.

43. An apparatus as claimed in claim 42, in which both fluid feeds and the denser fluid product are directed generally downward, while the less dense fluid product is directed generally upward after its separation from the spinning denser fluid ring.

44. An apparatus as claimed in claim 43, comprising at least one intermediate conduit, each having a generally circular transverse section, coaxial with the inner and outer conduits, open at both ends, converging downward towards its lower end and overlapping the open lower end of an inner conduit, to divide the generally annular section of the outer conduit so as to provide an additional generally annular section in each intermediate conduit and to define an outlet for each such generally annular section that can be curtained off by a spinning denser fluid ring connecting the lower end of each inner conduit to the conduit overlapping that lower end.

45. An apparatus as claimed in claim 44, in which at least one of the said generally annular sections is provided with a stationary guide shaped to accelerate the spin of the less dense fluid feed around the longitudinal axis of the conduits during the flow thereof through the said annular section.

46. An apparatus as claimed in claim 42, in which both fluid feeds and the less dense fluid product are directed generally upward, while the denser fluid product is directed generally downward after its separation from the spinning denser fluid ring.

* * * * *